(12) United States Patent
Chendamarai Kannan et al.

(10) Patent No.: US 10,405,262 B2
(45) Date of Patent: Sep. 3, 2019

(54) TECHNIQUES FOR SIGNALING A PUBLIC LAND MOBILE NETWORK IDENTIFIER OVER A SHARED RADIO FREQUENCY SPECTRUM BAND

(71) Applicant: QUALCOMM Incorporated, San Diego, CA (US)

(72) Inventors: Arumugam Chendamarai Kannan, San Diego, CA (US); Andrei Dragos Radulescu, San Diego, CA (US); Chirag Patel, San Diego, CA (US); Tamer Kadous, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 15/679,034

(22) Filed: Aug. 16, 2017

(65) Prior Publication Data

US 2018/0242223 A1 Aug. 23, 2018

Related U.S. Application Data

(60) Provisional application No. 62/461,720, filed on Feb. 21, 2017.

(51) Int. Cl.
| | |
|---|---|
| *H04W 48/08* | (2009.01) |
| *H04W 16/14* | (2009.01) |
| *H04W 48/12* | (2009.01) |
| *H04W 48/16* | (2009.01) |
| *H04W 48/18* | (2009.01) |
| *H04W 74/08* | (2009.01) |
| *H04W 88/02* | (2009.01) |
| *H04W 84/04* | (2009.01) |
| *H04W 16/28* | (2009.01) |
| *H04W 56/00* | (2009.01) |
| *H04W 74/00* | (2009.01) |

(52) U.S. Cl.
CPC .......... *H04W 48/08* (2013.01); *H04W 16/14* (2013.01); *H04W 48/12* (2013.01); *H04W 48/16* (2013.01); *H04W 48/18* (2013.01); *H04W 16/28* (2013.01); *H04W 56/001* (2013.01); *H04W 74/008* (2013.01); *H04W 74/0833* (2013.01); *H04W 84/042* (2013.01); *H04W 88/02* (2013.01)

(58) Field of Classification Search
CPC ..... H04W 48/08; H04W 88/02; H04W 16/14; H04W 48/12
USPC ........................ 370/252, 328, 338
See application file for complete search history.

(56) References Cited

PUBLICATIONS

International Search Report and Written Opinion—PCT/US2018/014543—ISA/EPO—dated Aug. 6, 2018.

(Continued)

*Primary Examiner* — Sam Bhattacharya
(74) *Attorney, Agent, or Firm* — Holland & Hart LLP

(57) ABSTRACT

Techniques are described for wireless communication. A method for wireless communication at a user equipment (UE) includes receiving an instance of a discovery reference signal (DRS) on a beam over a shared radio frequency spectrum band; determining a public land mobile network identifier (PLMN ID) based at least in part on a time-frequency location of the instance of the DRS; and selectively performing a random access procedure based at least in part on the determined PLMN ID. A method for wireless communication at a base station includes transmitting an instance of a DRS on a beam over a shared radio frequency spectrum band; and transmitting a PLMN ID based at least in part on a time-frequency location of the DRS.

26 Claims, 28 Drawing Sheets

(56) References Cited

PUBLICATIONS

Huawei., et al., "Unified On-Demand Initial Access Signals Transmission for Connected and Idle UE Mobility," 3GPP Draft; R1-1611668, 3rd Generation Partnership Project (3GPP), Mobile Competence Centre; 650, Route Des Lucioles; F-06921 Sophia-Antipolis Cedex; France, vol. RAN WG1, Reno, USA; Nov. 14, 2016-Nov. 18, 2016, Nov. 13, 2016 (Nov. 13, 2016), XP051175640, 6 pages, Retrieved from the Internet: URL: http://www.3gpp.org/ftp/Meetings_3GPP_SYNC/RAN1/Docs/ [retrieved on Nov. 13, 2016].

NTT Docomo Inc: "Discussion on Initial Access Procedure for NR," 3GPP Draft; R1-1612723, Discussion on Initial Access Procedure for NR Final, 3rd Generation Partnership Project (3GPP), Mobile Competence Centre; 650, Route Des Lucioles; F-06921, Sophia-Antipolis Cedex, vol. RAN WG1, Reno, USA; Nov. 14, 2016-Nov. 18, 2016, Nov. 13, 2016 (Nov. 13, 2016), XP051176666, 5 pages, Retrieved from the Internet: URL: http://www.3gpp.org/ftp/Meetings_3GPP_SYNC/RAN1/Docs/ [retrieved on Nov. 13, 2016].

NTT Docomo Inc., "Discussion on Broadcast Signal/Channel Design for NR," 3GPP Draft; R1-1612722, Discussion on Broadcast Signal Channel Design for NR Final, 3rd Generation Partnership Project (3GPP), Mobile Competence Centre; 650, Route Des Lucioles; F-06921 Sophia-Antipolis Cedex, vol. RAN WG1, Reno, USA; Nov. 14, 2016-Nov. 18, 2016, Nov. 13, 2016 (Nov. 13, 2016), XP051176665, 6 pages, Retrieved from the Internet: URL: http://www.3gpp.org/ftp/Meetings_3GPP_SYNC/RAN1/Docs/ [retrieved on Nov. 13, 2016].

Partial International Search Report—PCT/US2018/014543—ISA/EPO—dated Jun. 13, 2018.

Qualcomm Incorporated: "DRS Design Details," 3GPP Draft; R1-155725, DRS Design Details,3rd Generation Partnership Project (3GPP), Mobile Competence Centre; 650, Route Des Lucioles; F-06921, Sophia-Antipolis Cedex; France, vol. RAN WG1, Malmo, Sweden; Oct. 5, 2015-Oct. 9, 2015, Oct. 4, 2015 (Oct. 4, 2015), XP051002554, 4 pages, Retrieved from the Internet: URL: http://www.3gpp.org/ftp/Meetings_3GPP_SYNC/RAN1/Docs/ [retrieved on Oct. 4, 2015].

TECHNIQUES FOR SIGNALING A PUBLIC LAND MOBILE NETWORK IDENTIFIER OVER A SHARED RADIO FREQUENCY SPECTRUM BAND

CROSS REFERENCES

The present application for patent claims priority to U.S. Provisional Patent Application No. 62/461,720 by CHEN-DAMARAI KANNAN, et al., entitled "TECHNIQUES FOR SIGNALING A PUBLIC LAND MOBILE NETWORK IDENTIFIER OVER A SHARED RADIO FREQUENCY SPECTRUM BAND," filed Feb. 21, 2017, assigned to the assignee hereof.

BACKGROUND

Field of the Disclosure

The present disclosure, for example, relates to wireless communication systems, and more particularly to techniques for signaling a public land mobile network identifier (PLMN ID) over a shared radio frequency spectrum band.

Description of Related Art

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

A wireless multiple-access communication system may include a number of base stations, each simultaneously supporting communication for multiple communication devices, otherwise known as user equipment (UEs). In a Long-Term Evolution (LTE) or LTE-Advanced (LTE-A) network, a set of one or more base stations may define an eNodeB (eNB). In a next generation, new radio (NR), millimeter wave (mmW), or 5G network, a base station may take the form of a smart radio head (or radio head (RH)) or access node controller (ANC), with a set of smart radio heads in communication with an ANC defining a gNodeB (gNB). A base station may communicate with a set of UEs on downlink channels (e.g., for transmissions from a base station to a UE) and uplink channels (e.g., for transmissions from a UE to a base station).

Wireless devices that operate in mmW frequency ranges, e.g., 28 GHz, 40 GHz, 60 GHz, etc. may be associated with increased signal attenuation (e.g., path loss), which may be influenced by various factors, such as temperature, barometric pressure, diffraction, etc. As a result, signal processing techniques, such as beamforming, may be used to coherently combine energy and overcome the path losses at these frequencies.

SUMMARY

User equipment (UEs) that operate in a shared radio frequency spectrum band (and in some cases, in a mmW shared radio frequency spectrum band) may receive signals from wireless devices associated with various operators (e.g., public land mobile networks (PLMNs)). Wireless devices that receive discovery reference signals (DRSs) from base stations associated with various operators may initiate random access procedures with the base stations, only to determine that some (if not most) of the base stations are associated with PLMNs other than a PLMN associated with the UE. Resources, including time and battery power, may be wasted when a UE initiates a random access procedure with a base station that is not associated with a PLMN of the UE. A random access procedure performed using beamformed communications may consume relatively more resources. Techniques described in the present disclosure may be used to signal a PLMN identifier (ID) over a shared radio frequency spectrum band, based at least in part on a time-frequency location of an instance of a DRS, and in some cases in or with the instance of the DRS, so that a UE may determine at an early time whether performing a random access procedure with a base station may be useful.

In one example, a method for wireless communication at a UE is described. The method may include receiving an instance of a DRS on a beam over a shared radio frequency spectrum band; determining a PLMN ID based at least in part on a time-frequency location of the instance of the DRS; and selectively performing a random access procedure based at least in part on the determined PLMN ID.

In some examples, the method may include receiving an instance of a system information block (SIB) on the beam, in which the instance of the SIB is frequency division multiplexed with the instance of the DRS, and in which the PLMN ID is determined based at least in part on the instance of the SIB. In some examples, the instance of the DRS may be a second instance of the DRS, and the method may further include receiving a first instance of the DRS on the beam; synchronizing with a base station based at least in part on a set of one or more synchronization signals included in the first instance of the DRS; and decoding the instance of the SIB based at least in part on the synchronizing with the base station. In some examples, the method may include determining the PLMN ID based at least in part on the time-frequency location of the instance of the DRS matches a second PLMN ID associated with the UE; decoding random access configuration information included in at least one of the first instance of the DRS or the second instance of the DRS; and performing the random access procedure based at least in part on the determined PLMN ID match and the decoded random access configuration information, to connect to the base station. In some examples, the method may include determining the PLMN ID based at least in part on the time-frequency location of the instance of the DRS does not match a second PLMN ID associated with the UE; and refraining from performing the random access procedure based at least in part on the determined non-match. In some examples, the instance of the DRS and the instance of the SIB may be received according to a DRS-to-SIB transmit power ratio. In some examples, the DRS-to-SIB transmit power ratio may include one of a plurality of predetermined DRS-to-SIB transmit power ratios. In some examples, the instance of the DRS may include an indication of a transmit power of the instance of the DRS relative to a reference power. In some examples, the instance of the DRS may be a first instance of the DRS, and the method may further include receiving a second instance of the DRS; measuring the first instance of the DRS and the second instance of the DRS; and combining measurements of the first instance of the DRS and the second instance of the DRS based at least in part on the indication of the power of the first instance of the DRS. In some examples, the instance of the DRS may include at least one of a first demodulation reference signal included in the instance of the DRS due to the presence of the instance of the SIB that is frequency division multiplexed with the instance of the DRS, a second demodulation reference signal included in each instance of the DRS, or a combination thereof.

In some examples of the method, determining the PLMN ID may include receiving the PLMN ID hashed with a physical broadcast channel (PBCH) received in the instance of the DRS. In some examples, the method may include determining the PLMN ID based at least in part on the time-frequency location of the instance of the DRS matches a second PLMN ID associated with the UE; decoding random access configuration information included in at least one of the first instance of the DRS or another instance of the DRS; and performing the random access procedure based at least in part on the determined match and the decoded random access configuration information, to connect to a base station. In some examples, the method may include determining the PLMN ID based at least in part on the time-frequency location of the instance of the DRS does not match a second PLMN ID associated with the UE; and refraining from performing the random access procedure based at least in part on the determined non-match.

In some examples of the method, the instance of the DRS may include an indication of a resource location of a SIB transmitted on the beam, and the method may further include receiving the instance of the SIB on the beam at the indicated resource location. In these latter examples, the PLMN ID may be determined based at least in part on the instance of the SIB. In some examples, the resource location may include a time window in which a transmission of the instance of the SIB commences. In some examples, the instance of the DRS may be part of a multi-beam DRS transmission, and the instance of the SIB may be received as a single beam transmission. In some examples, the indication of the resource location of the instance of the SIB may be included in at least one of a PBCH received in the instance of the DRS, Layer 1 signaling associated with the instance of the DRS, or a combination thereof. In some examples, the method may include determining the PLMN ID based at least in part on the time-frequency location of the instance of the DRS matches a second PLMN ID associated with the UE; decoding random access configuration information included in at least one of the first instance of the DRS or another instance of the DRS; and performing the random access procedure based at least in part on the determined match and the decoded random access configuration information, to connect to a base station. In some examples, the method may include determining the PLMN ID based at least in part on the time-frequency location of the instance of the DRS does not match a second PLMN ID associated with the UE; and refraining from performing the random access procedure based at least in part on the determined non-match.

In one example, an apparatus for wireless communication at a UE is described. The apparatus may include means for receiving an instance of a DRS on a beam over a shared radio frequency spectrum band; means for determining a PLMN ID based at least in part on a time-frequency location of the instance of the DRS; and means for selectively performing a random access procedure based at least in part on the determined PLMN ID.

In some examples, the apparatus may include means for receiving an instance of a SIB on the beam, in which the instance of the SIB is frequency division multiplexed with the instance of the DRS, and in which the PLMN ID is determined based at least in part on the instance of the SIB. In some examples, the instance of the DRS may be a second instance of the DRS, and the apparatus may further include means for receiving a first instance of the DRS on the beam; means for synchronizing with a base station based at least in part on a set of one or more synchronization signals included in the first instance of the DRS; and means for decoding the instance of the SIB based at least in part on the synchronizing with the base station. In some examples, the apparatus may include means for determining the PLMN ID based at least in part on the time-frequency location of the instance of the DRS matches a second PLMN ID associated with the UE; means for decoding random access configuration information included in at least one of the first instance of the DRS or the second instance of the DRS; and means for performing the random access procedure based at least in part on the determined PLMN ID match and the decoded random access configuration information, to connect to the base station. In some examples, the apparatus may include means for determining the PLMN ID based at least in part on the time-frequency location of the instance of the DRS does not match a second PLMN ID associated with the UE; and means for refraining from performing the random access procedure based at least in part on the determined non-match. In some examples, the instance of the DRS and the instance of the SIB may be received according to a DRS-to-SIB transmit power ratio. In some examples, the DRS-to-SIB transmit power ratio may include one of a plurality of predetermined DRS-to-SIB transmit power ratios. In some examples, the instance of the DRS may include an indication of a transmit power of the instance of the DRS relative to a reference power. In some examples, the instance of the DRS may be a first instance of the DRS, and the apparatus may further include means for receiving a second instance of the DRS; means for measuring the first instance of the DRS and the second instance of the DRS; and means for combining measurements of the first instance of the DRS and the second instance of the DRS based at least in part on the indication of the power of the first instance of the DRS. In some examples, the instance of the DRS may include at least one of a first demodulation reference signal included in the instance of the DRS due to the presence of the instance of the SIB that is frequency division multiplexed with the instance of the DRS, a second demodulation reference signal included in each instance of the DRS, or a combination thereof.

In some examples of the apparatus, the means for determining the PLMN ID may include means for receiving the PLMN ID hashed with a PBCH received in the instance of the DRS. In some examples, the apparatus may include means for determining the PLMN ID based at least in part on the time-frequency location of the instance of the DRS matches a second PLMN ID associated with the UE; means for decoding random access configuration information included in at least one of the first instance of the DRS or another instance of the DRS; and means for performing the random access procedure based at least in part on the determined match and the decoded random access configuration information, to connect to a base station. In some examples, the apparatus may include means for determining the PLMN ID based at least in part on the time-frequency location of the instance of the DRS does not match a second PLMN ID associated with the UE; and means for refraining from performing the random access procedure based at least in part on the determined non-match.

In some examples of the apparatus, the instance of the DRS may include an indication of a resource location of a SIB transmitted on the beam, and the apparatus may further include means for receiving the instance of the SIB on the beam at the indicated resource location. In these examples, the PLMN ID may be determined based at least in part on the instance of the SIB. In some examples, the resource location may include a time window in which a transmission of the instance of the SIB commences. In some examples, the instance of the DRS may be part of a multi-beam DRS transmission, and the instance of the SIB may be received as a single beam transmission. In some examples, the indication of the resource location of the instance of the SIB may be included in at least one of a PBCH received in the instance of the DRS, Layer 1 signaling associated with the instance of the DRS, or a combination thereof. In some examples, the apparatus may include means for determining the PLMN ID based at least in part on the time-frequency location of the instance of the DRS matches a second PLMN ID associated with the UE; means for decoding random access configuration information included in at least one of the first instance of the DRS or another instance of the DRS; and means for performing the random access procedure based at least in part on the determined match and the decoded random access configuration information, to connect to a base station. In some examples, the apparatus may include means for determining the PLMN ID based at least in part on the time-frequency location of the instance of the DRS does not match a second PLMN ID associated with the UE; and means for refraining from performing the random access procedure based at least in part on the determined non-match.

In one example, another apparatus for wireless communication at a UE is described. The apparatus may include a processor, memory in electronic communication with the processor, and instructions stored in the memory. The instructions may be executable by the processor to receive an instance of a DRS on a beam over a shared radio frequency spectrum band; to determine a PLMN ID based at least in part on a time-frequency location of the instance of the DRS; and to selectively perform a random access procedure based at least in part on the determined PLMN ID.

In some examples of the apparatus, the instructions may be executable by the processor to receive an instance of a SIB on the beam, in which the instance of the SIB is frequency division multiplexed with the instance of the DRS, and in which the PLMN ID is determined based at least in part on the instance of the SIB. In some examples, the instance of the DRS may be a second instance of the DRS, and the instructions may be executable by the processor to receive a first instance of the DRS on the beam; synchronize with a base station based at least in part on a set of one or more synchronization signals included in the first instance of the DRS; and decode the instance of the SIB based at least in part on the synchronizing with the base station. In some examples, the instance of the DRS and the instance of the SIB may be received according to a DRS-to-SIB transmit power ratio. In some examples, the instance of the DRS may include an indication of a transmit power of the instance of the DRS relative to a reference power. In some examples, the instance of the DRS may include at least one of a first demodulation reference signal included in the instance of the DRS due to the presence of the instance of the SIB that is frequency division multiplexed with the instance of the DRS, a second demodulation reference signal included in each instance of the DRS, or a combination thereof.

In some examples of the apparatus, the instructions executable by the processor to determine the PLMN ID may include instructions executable by the processor to receive the PLMN ID hashed with a PBCH received in the instance of the DRS. In some examples, the instance of the DRS may include an indication of a resource location of a SIB transmitted on the beam, and the instructions may be executable by the processor to receive the instance of the SIB on the beam at the indicated resource location. In these latter examples, the PLMN ID may be determined based at least in part on the instance of the SIB. In some examples, the resource location may include a time window in which a transmission of the instance of the SIB commences. In some examples, the instance of the DRS may be part of a multi-beam DRS transmission, and the instance of the SIB may be received as a single beam transmission.

In one example, a non-transitory computer-readable medium storing code for wireless communication at a UE is described. The code may include instructions executable to receive an instance of a DRS on a beam over a shared radio frequency spectrum band; to determine a PLMN ID based at least in part on a time-frequency location of the instance of the DRS; and to selectively perform a random access procedure based at least in part on the determined PLMN ID.

In some examples of the non-transitory computer-readable medium, the code may include instructions executable to receive an instance of a SIB on the beam, in which the instance of the SIB is frequency division multiplexed with the instance of the DRS, and in which the PLMN ID may be determined based at least in part on the instance of the SIB. In some examples, the instructions executable to determine the PLMN ID may include instructions executable to receive the PLMN ID hashed with a PBCH received in the instance of the DRS. In some examples, the instance of the DRS may include an indication of a resource location of a SIB transmitted on the beam, and the code may include instructions executable to receive the instance of the SIB on the beam at the indicated resource location. In these latter examples, the PLMN ID may be determined based at least in part on the instance of the SIB.

In one example, a method for wireless communication at a base station is described. The method may include transmitting an instance of a DRS on a beam over a shared radio frequency spectrum band; and transmitting a PLMN ID based at least in part on a time-frequency location of the DRS.

In some examples, the method may include transmitting an instance of a SIB on the beam, in which the instance of the SIB is frequency division multiplexed with the instance of the DRS, and in which the PLMN ID may be transmitted in the instance of the SIB. In some examples, the instance of the DRS may be a second instance of the DRS, and the method may further include transmitting a first instance of the DRS. In these examples, each of the first instance of the DRS and the second instance of the DRS may include a set of one or more synchronization signals for synchronizing with the base station. In some examples, the instance of the DRS and the instance of the SIB may be transmitted according to a DRS-to-SIB transmit power ratio. In some examples, the method may include selecting the DRS-to-SIB transmit power ratio from a plurality of predetermined DRS-to-SIB transmit power ratios. In some examples, the method may include selecting a transmit power for the instance of the DRS; and transmitting, in the instance of the DRS, an indication of the transmit power of the instance of the DRS relative to a reference power. In some examples, the method may include transmitting, in the instance of the DRS, at least one of a first demodulation reference signal included in the instance of the DRS due to the transmission of the instance of the SIB that is frequency division multiplexed with the instance of the DRS, a second demodulation reference signal included in each instance of the DRS, or a combination thereof. In some examples, the method may include selecting a Listen Before Talk (LBT) priority class for the instance of the DRS based at least in part on the transmission of the instance of the SIB that is frequency division multiplexed with the instance of the DRS. In some examples, the method may include performing a first LBT procedure for a first frequency range associated with the instance of the DRS, and a second LBT procedure for a second frequency range associated with the instance of the SIB. In these latter examples, the instance of the DRS may be transmitted based at least in part on the first LBT procedure, and the instance of the SIB may be transmitted based at least in part on the second LBT procedure.

In some examples of the method, transmitting the PLMN ID may include transmitting the PLMN ID hashed with a PBCH transmitted in the instance of the DRS. In some examples, the method may include transmitting, in the instance of the DRS, an indication of a resource location of a SIB transmitted on the beam; transmitting the instance of the SIB at the indicated resource location; and transmitting the PLMN ID in the instance of the SIB. In some examples, the indication of the resource location may include an indication of a time window in which a transmission of the instance of the SIB commences, and the instance of the SIB may be transmitted subject to completion of a LBT procedure. In some examples, the instance of the DRS may be part of a multi-beam DRS transmission, and the instance of the SIB may be transmitted frequency division multiplexed with a directional DRS transmission. In some examples, the resource location of the instance of the SIB may be transmitted in at least one of a PBCH transmitted in the instance of the DRS, Layer 1 signaling associated with the instance of the DRS, or a combination thereof.

In one example, an apparatus for wireless communication at a base station is described, the apparatus may include means for transmitting an instance of a DRS on a beam over a shared radio frequency spectrum band; and means for transmitting a PLMN ID based at least in part on a time-frequency location of the DRS.

In some examples, the apparatus may include means for transmitting an instance of a SIB on the beam, in which the instance of the SIB is frequency division multiplexed with the instance of the DRS, and in which the PLMN ID is transmitted in the instance of the SIB. In some examples, the instance of the DRS may be a second instance of the DRS, and the apparatus may further include means for transmitting a first instance of the DRS. In these examples, each of the first instance of the DRS and the second instance of the DRS may include a set of one or more synchronization signals for synchronizing with the base station. In some examples, the instance of the DRS and the instance of the SIB may be transmitted according to a DRS-to-SIB transmit power ratio. In some examples, the apparatus may include means for selecting the DRS-to-SIB transmit power ratio from a plurality of predetermined DRS-to-SIB transmit power ratios. In some examples, the apparatus may include means for selecting a transmit power for the instance of the DRS; and means for transmitting, in the instance of the DRS, an indication of the transmit power of the instance of the DRS relative to a reference power. In some examples, the apparatus may include means for transmitting, in the instance of the DRS, at least one of a first demodulation reference signal included in the instance of the DRS due to the transmission of the instance of the SIB that is frequency division multiplexed with the instance of the DRS, a second demodulation reference signal included in each instance of the DRS, or a combination thereof. In some examples, the apparatus may include means for selecting a LBT priority class for the instance of the DRS based at least in part on the transmission of the instance of the SIB that is frequency division multiplexed with the instance of the DRS. In some examples, the apparatus may include means for performing a first LBT procedure for a first frequency range associated with the instance of the DRS, and a second LBT procedure for a second frequency range associated with the instance of the SIB. In these latter examples, the instance of the DRS may be transmitted based at least in part on the first LBT procedure, and the instance of the SIB may be transmitted based at least in part on the second LBT procedure.

In some examples of the apparatus, the means for transmitting the PLMN ID may include means for transmitting the PLMN ID hashed with a PBCH transmitted in the instance of the DRS. In some examples, the apparatus may include means for transmitting, in the instance of the DRS, an indication of a resource location of a SIB transmitted on the beam; means for transmitting the instance of the SIB at the indicated resource location; and means for transmitting the PLMN ID in the instance of the SIB. In some examples, the indication of the resource location may include an indication of a time window in which a transmission of the instance of the SIB commences, and the instance of the SIB may be transmitted subject to completion of a LBT procedure. In some examples, the instance of the DRS may be part of a multi-beam DRS transmission, and the instance of the SIB may be transmitted frequency division multiplexed with a directional DRS transmission. In some examples, the resource location of the instance of the SIB may be transmitted in at least one of a PBCH transmitted in the instance of the DRS, Layer 1 signaling associated with the instance of the DRS, or a combination thereof.

In one example, an apparatus for wireless communication at a base station is described. The apparatus may include a processor, memory in electronic communication with the processor, and instructions stored in the memory. The instructions may be executable by the processor to transmit an instance of a DRS on a beam over a shared radio frequency spectrum band; and to transmit a PLMN ID based at least in part on a time-frequency location of the DRS.

In some examples of the apparatus, the instructions may be executable by the processor to transmit an instance of a SIB on the beam, in which the instance of the SIB is frequency division multiplexed with the instance of the DRS, and in which the PLMN ID may be transmitted in the instance of the SIB. In some examples, the instance of the DRS and the instance of the SIB may be transmitted according to a DRS-to-SIB transmit power ratio. In some examples, the instructions may be executable by the processor to select a transmit power for the instance of the DRS; and to transmit, in the instance of the DRS, an indication of the transmit power of the instance of the DRS relative to a reference power. In some examples, the instructions may be executable by the processor to transmit, in the instance of the DRS, at least one of a first demodulation reference signal included in the instance of the DRS due to the transmission of the instance of the SIB that is frequency division multiplexed with the instance of the DRS, a second demodulation reference signal included in each instance of the DRS, or a combination thereof. In some examples, the instructions may be executable by the processor to select a LBT priority class for the instance of the DRS based at least in part on the transmission of the instance of the SIB that is frequency division multiplexed with the instance of the DRS. In some examples, the instructions may be executable by the processor to perform a first LBT procedure for a first frequency range associated with the instance of the DRS, and a second LBT procedure for a second frequency range associated with the instance of the SIB. In these latter examples, the instance of the DRS may be transmitted based at least in part on the first LBT procedure, and the instance of the SIB may be transmitted based at least in part on the second LBT procedure.

In some examples of the apparatus, the instructions executable by the processor to transmit the PLMN ID may include instructions executable by the processor to transmit the PLMN ID hashed with a PBCH transmitted in the instance of the DRS. In some examples, the instructions may be executable by the processor to transmit, in the instance of the DRS, an indication of a resource location of a SIB transmitted on the beam; to transmit the instance of the SIB at the indicated resource location; and to transmit the PLMN ID in the instance of the SIB. In some examples, the indication of the resource location may include an indication of a time window in which a transmission of the instance of the SIB commences, and the instance of the SIB may be transmitted subject to completion of a LBT procedure. In some examples, the instance of the DRS may be part of a multi-beam DRS transmission, and the instance of the SIB may be transmitted frequency division multiplexed with a directional DRS transmission.

In one example, a non-transitory computer-readable medium storing code for wireless communication at a wireless device is described. The code may include instructions executable to transmit an instance of a DRS on a beam over a shared radio frequency spectrum band; and to transmit a PLMN ID based at least in part on a time-frequency location of the DRS.

In some examples of the non-transitory computer-readable medium, the code may include instructions executable to transmit an instance of a SIB on the beam, in which the instance of the SIB is frequency division multiplexed with the instance of the DRS, and in which the PLMN ID is transmitted in the instance of the SIB. In some examples, the instructions executable to transmit the PLMN ID may include instructions executable to transmit the PLMN ID hashed with a PBCH transmitted in the instance of the DRS. In some examples, the code may include instructions executable to transmit, in the instance of the DRS, an indication of a resource location of a SIB transmitted on the beam; to transmit the instance of the SIB at the indicated resource location; and to transmit the PLMN ID in the instance of the SIB.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

A wireless communication system (e.g., a mmW system) may utilize directional or beamformed transmissions (e.g., beams) for communication. For example, a base station may transmit signals and perform contention procedures on multiple beams associated with different directions. In some cases, the base station may engage in beam sweeping over a portion (or all) of the possible beams for transmitting messages or signals intended for user equipment (UEs) distributed throughout a coverage area of the base station. For example, a base station may transmit discovery reference signals (DRSs) using one or more beams. A UE that receives a DRS from the base station may use the DRS to synchronize with the base station, to acquire a network, and to obtain information for initiating a random access procedure with the base station.

Techniques described in the present disclosure may be used to signal a public land mobile network identifier (PLMN ID) based at least in part on a time-frequency location of an instance of a DRS. Signaling the PLMN ID to a UE early, instead of waiting for the UE to discover the PLMN ID during performance of a random access procedure, may reduce the number of random access procedures performed by the UE, thereby conserving resources.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various operations may be added, omitted, or combined. Also, features described with respect to some examples may be combined in some other examples.

Figure 1:
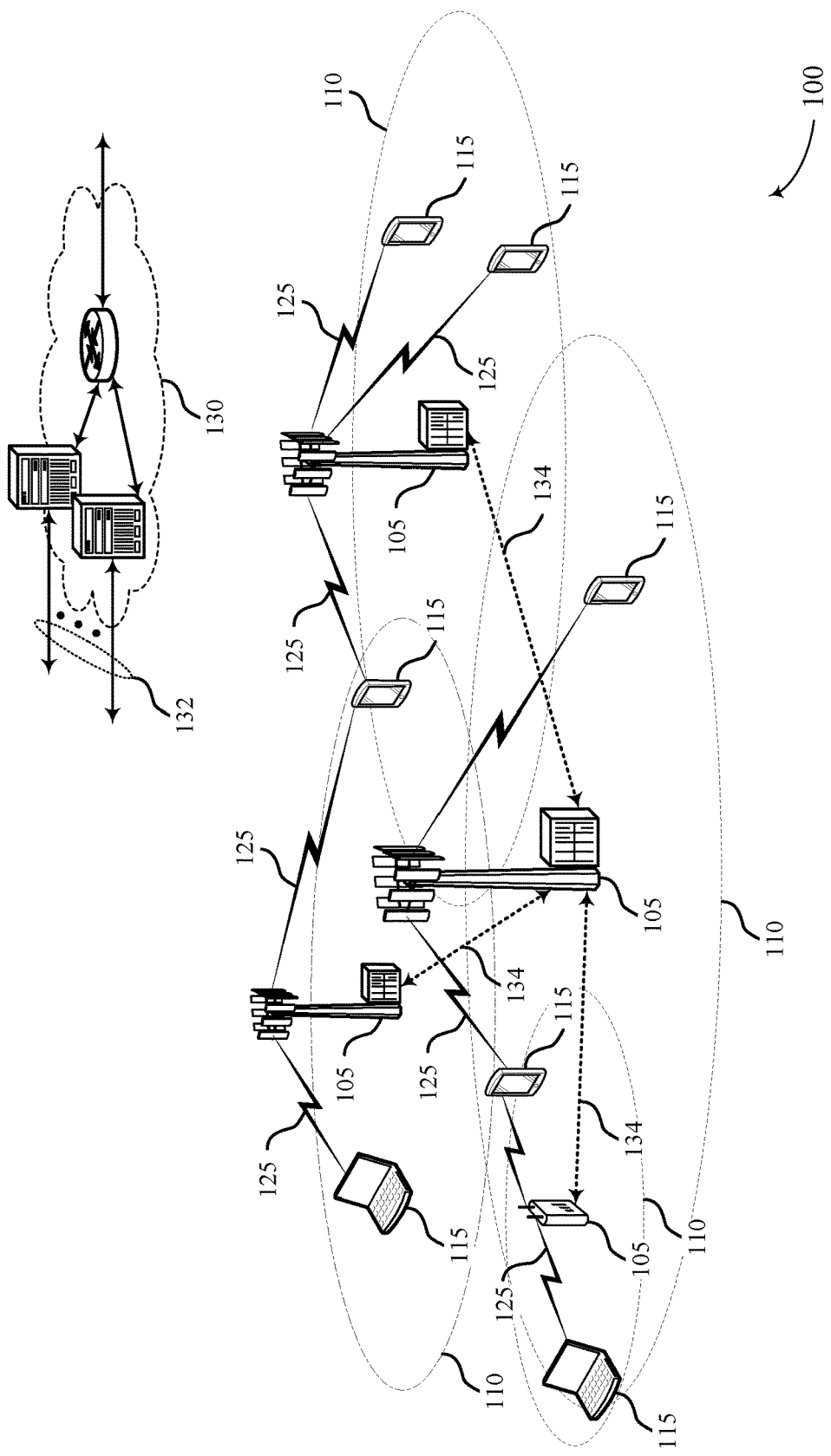
FIG. 1 shows an example of a wireless communication system, in accordance with various aspects of the present disclosure.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE), LTE-Advanced (LTE-A) network, or a New Radio (NR) network. In some cases, wireless communications system 100 may support enhanced broadband communications, ultra-reliable (i.e., mission critical) communications, low latency communications, and communications with low-cost and low-complexity devices.

Base stations 105 may wirelessly communicate with UEs 115 via one or more base station antennas. Each base station 105 may provide communication coverage for a respective geographic coverage area 110. Communication links 125 shown in wireless communications system 100 may include uplink (UL) transmissions from a UE 115 to a base station 105, or downlink (DL) transmissions, from a base station 105 to a UE 115. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a TTI of a downlink channel may be distributed between different control regions in a cascaded manner (e.g., between a common control region and one or more UE-specific control regions).

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of things (IoT) device, an Internet of Everything (IoE) device, a machine type communication (MTC) device, an appliance, an automobile, or the like.

In some cases, a UE 115 may also be able to communicate directly with other UEs (e.g., using a peer-to-peer (P2P) or device-to-device (D2D) protocol). One or more of a group of UEs 115 utilizing D2D communications may be within the geographic coverage area 110 of a cell. Other UEs 115 in such a group may be outside the geographic coverage area 110 of a cell, or otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out independent of a base station 105.

Some UEs 115, such as MTC or IoT devices, may be low cost or low complexity devices, and may provide for automated communication between machines, i.e., Machine-to-Machine (M2M) communication. M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some cases, an MTC device may operate using half-duplex (one-way) communications at a reduced peak rate. MTC devices may also be configured to enter a power saving "deep sleep" mode when not engaging in active communications. In some cases, MTC or IoT devices may be designed to support mission critical functions and wireless communications system may be configured to provide ultra-reliable communications for these functions.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

A base station 105 may be connected by an S1 interface to the core network 130. The core network may be an evolved packet core (EPC), which may include at least one mobility management entity (MME), at least one serving gateway (S-GW), and at least one Packet Data Network (PDN) gateway (P-GW). The MME may be the control node that processes the signaling between the UE 115 and the EPC. All user Internet Protocol (IP) packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS).

The core network 130 may provide user authentication, access authorization, tracking, IP connectivity, and other access, routing, or mobility functions. At least some of the network devices, such as base station 105 may include subcomponents such as an access network entity, which may be an example of an access node controller (ANC). Each access network entity may communicate with a number of UEs 115 through a number of other access network transmission entities, each of which may be an example of a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

At times, a UE 115 may perform an initial access (or initial acquisition) procedure with a base station 105. When performing the initial access procedure, the UE 115 may search for a synchronization channel transmitted by the base station 105. The synchronization channel may include information to synchronize the UE 115 with the base station 105, so that the UE 115 may communicate with the base station 105. After synchronizing with the base station 105, the UE 115 may initiate a random access procedure with the network by transmitting a random access preamble to the network.

In some examples, a UE 115 may include a wireless communication manager 140. The wireless communication manager 140 may be used by the UE 115 to receive an instance of a DRS on a beam over a shared radio frequency spectrum band; to determine a PLMN ID based at least in part on a time-frequency location of the instance of the DRS; and to selectively perform a random access procedure based at least in part on the determined PLMN ID.

In some examples, a base station 105 may transmit an instance of a DRS on a beam over a shared radio frequency spectrum band; and may transmit a PLMN ID based at least in part on a time-frequency location of the instance of the DRS. For example, the PLMN ID may be transmitted in an instance of a SIB that is frequency-division multiplexed with the instance of the DRS (in which case the instance of the SIB may be considered a part of the instance of the DRS if both the instance of the DRS and the instance of the SIB are transmitted in the same subframe). Alternatively, and by way of further example, the PLMN ID may be hashed with a PBCH received in the instance of the DRS. Alternatively, and by way of further example, the PLMN ID may be transmitted in an instance of a SIB that is offset in time (and may be frequency) from the time-frequency location of the instance of the DRS. In all of these examples, the instance of the DRS may be transmitted at a known (or signaled) time-frequency location, and the PLMN ID may be determined from a SIB or time-frequency location that is based at least in part on (e.g., included in or related to (e.g., offset from)) the time-frequency location of the instance of the SIB. In some examples, the relationship between the time-frequency location of the instance of the DRS and the location of the PLMN ID (or instance of the SIB) may be preconfigured or signaled.

Figure 2:
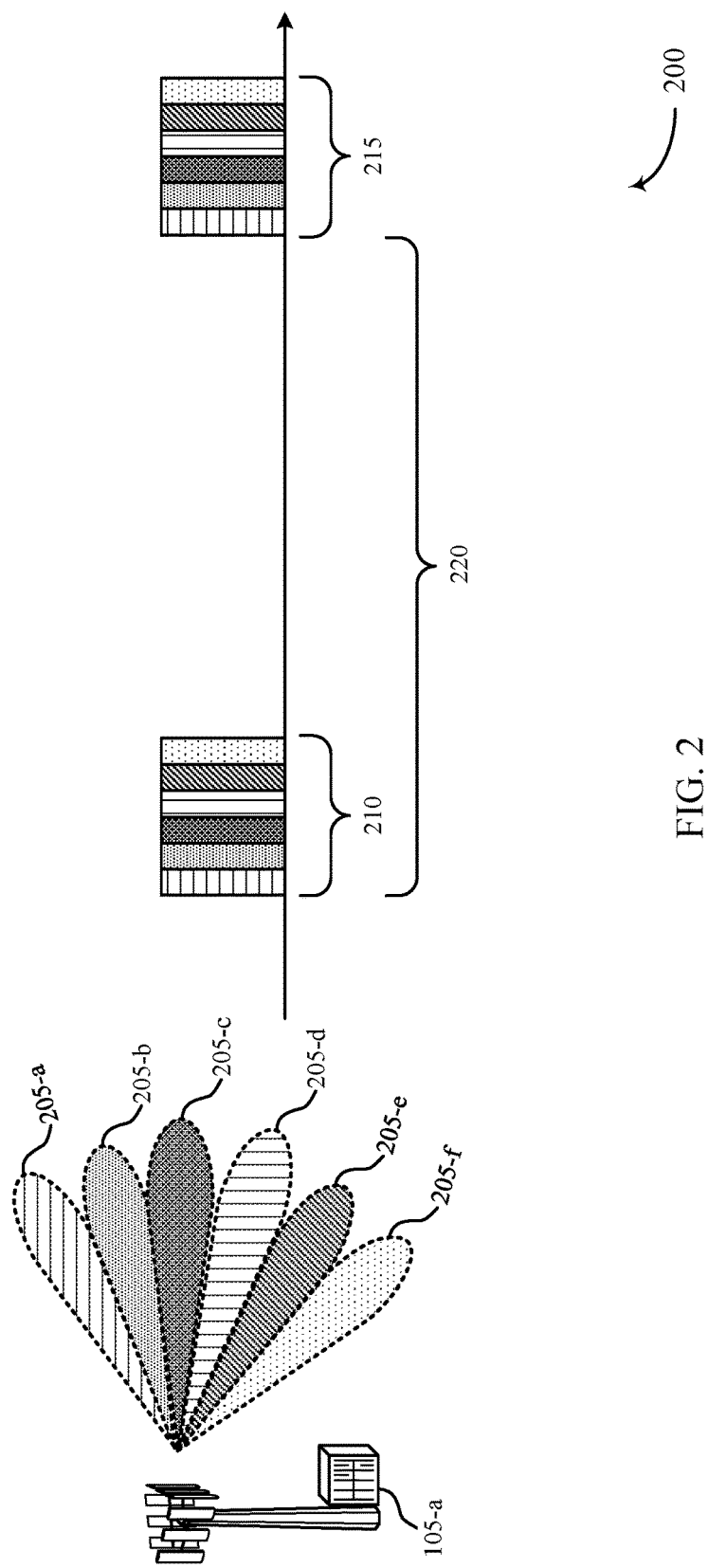
FIG. 2 shows a timeline of multi-beam discovery reference signal (DRS) transmissions, in accordance with various aspects of the present disclosure.

FIG. 2 shows a timeline 200 of multi-beam DRS transmissions, in accordance with various aspects of the present disclosure. The multi-beam DRS transmissions (e.g., a first multi-beam DRS transmission 210 and a second multi-beam DRS transmission 215) may be transmitted by a base station 105-a. The base station 105-a may be an example of aspects of the base stations described with reference to FIG. 1.

Each multi-beam DRS transmission may include a plurality of DRS transmissions transmitted over a shared radio frequency spectrum band, with each DRS transmission being transmitted on a different beam (i.e., on different directional beams 205, including, for example, a first beam 205-a, a second beam 205-b, a third beam 205-c, a fourth beam 205-d, a fifth beam 205-e, and a sixth beam 205-f) formed by the base station 105-a. In some examples, the plurality of DRS transmissions in a multi-beam DRS transmission may be adjacent or closely spaced in time (e.g., using a transmit beam sweep). In some examples, the plurality of DRS transmissions in a multi-beam DRS transmission may be transmitted during a contention exempt transmission (CET) period, without performing a LBT procedure prior to the multi-beam DRS transmission. In some examples, multi-beam DRS transmissions may be made periodically (e.g., at a periodicity 220).

Figure 3:
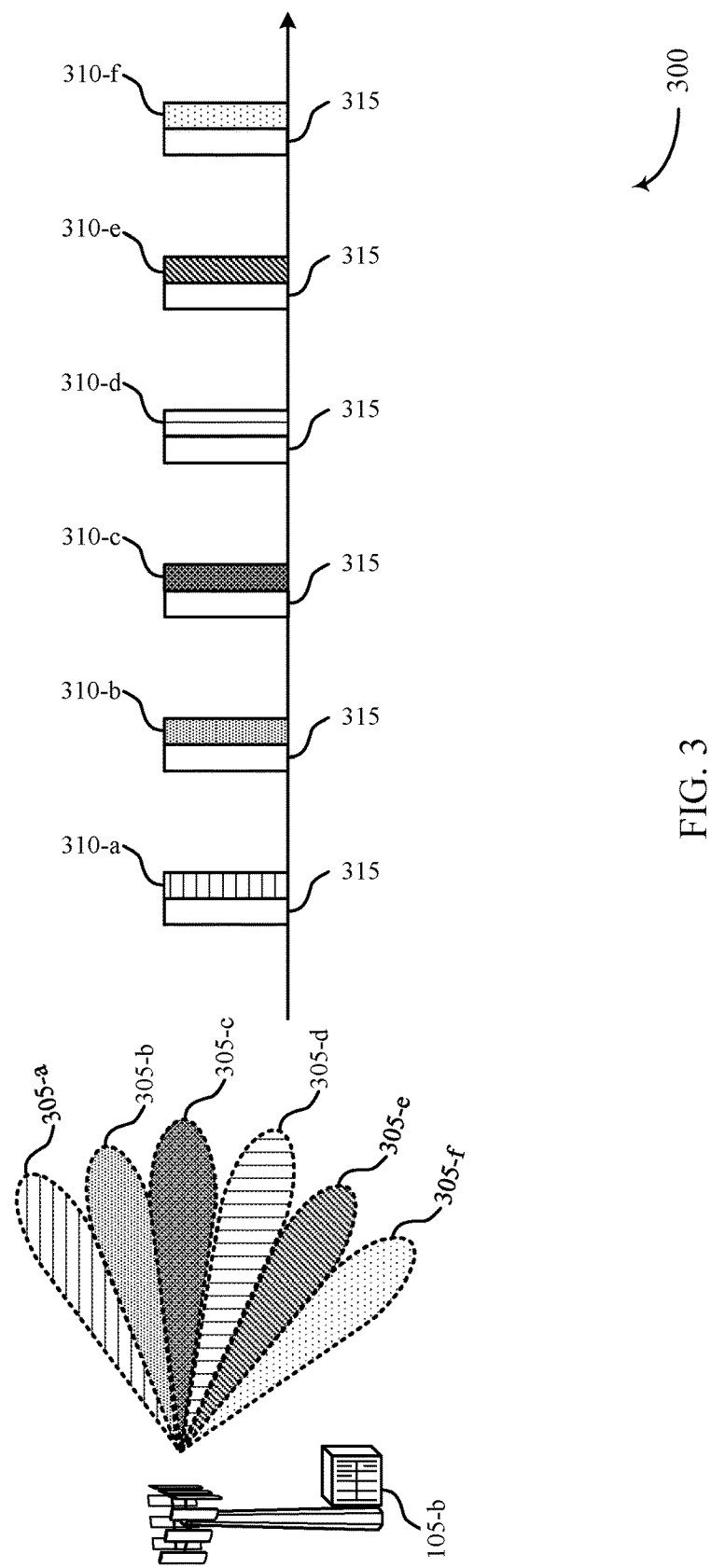
FIG. 3 shows a timeline of directional DRS transmissions, in accordance with various aspects of the present disclosure.

FIG. 3 shows a timeline 300 of directional DRS transmissions, in accordance with various aspects of the present disclosure. The directional DRS transmissions (e.g., a first directional DRS transmission 310-a, a second directional DRS transmission 310-b, a third directional DRS transmission 310-c, a fourth directional DRS transmission 310-d, a fifth directional DRS transmission 310-e, and a sixth directional DRS transmission 310-f) may be transmitted by a base station 105-b. The base station 105-b may be an example of aspects of the base stations described with reference to FIG. 1.

Each directional DRS transmission may be transmitted over a shared radio frequency spectrum band, with each directional DRS transmission being transmitted on one of a number of beams (i.e., on one of a number of directional beams 305, including, for example, a first beam 305-a, a second beam 305-b, a third beam 305-c, a fourth beam 305-d, a fifth beam 305-e, and a sixth beam 305-f) formed by the base station 105-b. Each of the directional DRS transmissions may be preceded by the performance of a LBT procedure 315 by the base station 105-b. During a LBT procedure 315, the base station 105-b may monitor the shared radio frequency spectrum band for energy or transmissions, to determine whether the shared radio frequency spectrum band is clear for use. In some examples, each LBT procedure 315 may be performed for a respective beam on which a directional DRS transmission is to be made. In other examples, each LBT procedure 315 may be performed in an omnidirectional manner or quasi-omnidirectional manner (e.g., for a group of beams).

Figure 4:
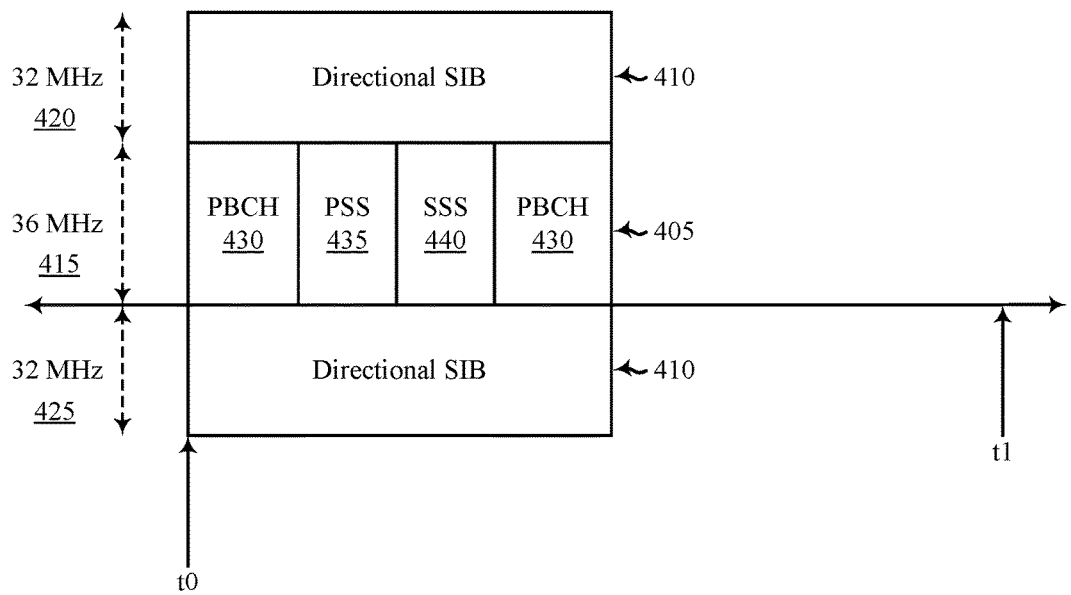
FIG. 4 shows a timeline of transmissions over a shared radio frequency spectrum band, in accordance with various aspects of the present disclosure.

FIG. 4 shows a timeline 400 of transmissions over a shared radio frequency spectrum band, in accordance with various aspects of the present disclosure. The transmissions may include transmissions of an instance of a DRS and an instance of a SIB by a base station, and transmissions by a UE and the base station related to performance of a random access procedure. The base station and UE may be examples of aspects of the base stations and UEs described with reference to FIG. 1.

At time t0, the base station may transmit an instance of a DRS 405. The instance of the DRS 405 may be transmitted on a beam over a shared radio frequency spectrum band. The instance of the DRS 405 may be an instance of a directional DRS, as described with reference to FIG. 3, or a directional part of an instance of a multi-beam DRS, as described with reference to FIG. 2.

The instance of the DRS 405 may include a PBCH 430, a primary synchronization signal (PSS) 435, and a secondary synchronization signal (SSS) 440. In some examples, the PBCH 430 may carry a system frame number, a synchronization signal (SS) block index, a bandwidth indication, random access configuration information (e.g., random access channel (RACH) information), or a minimum SIB. The timings (or sequential order) of the PBCH 430, the PSS 435, and the SSS 440 may vary. In FIG. 4, the PBCH 430 is shown to be split into portions located before and after the synchronization signals (i.e., the PSS 435 and SSS 440).

The base station may also transmit an instance of a SIB 410 on the beam (e.g., the base station may transmit a directional SIB). The instance of the SIB 410 may be frequency division multiplexed with the instance of the DRS 405. By way of example, the instance of the DRS 405 is shown to occupy a first frequency range 415 (e.g., a 36 MHz frequency range), and the instance of the SIB is shown to occupy frequency ranges on either side of, and contiguous with, the first frequency range 415 (e.g., a second frequency range 420 (e.g., a 32 MHz frequency range) and a third frequency range 425 (e.g., a 32 MHz frequency range)). In other examples, the instance of the DRS 405 may occupy a frequency range on just one side of the instance of the SIB 410, or the various frequency ranges may not be contiguous.

The instance of the SIB 410 may include various items of system information, including a PLMN ID associated with the base station that transmits the instance of the DRS 405 and the instance of the SIB 410. The PLMN ID included in the instance of the SIB 410 can enable a UE that receives the instance of the SIB 410 to selectively perform a random access procedure based at least in part on the PLMN ID. For example, the UE may determine that the PLMN ID included in the instance of the SIB 410 matches a PLMN ID associated with the UE, and the UE may perform a random access procedure at time t1 to connect with the base station that transmitted the instance of the DRS 405 and the instance of the SIB 410. Alternatively, the UE may determine that the PLMN ID included in the instance of the SIB 410 does not match the PLMN ID associated with the UE, and the UE may refrain from performing a random access procedure to connect with the base station that transmitted the instance of the DRS 405 and the instance of the SIB 410. The inclusion of the PLMN ID in the instance of the SIB 410 can help a UE avoid initiating a random access procedure with a base station associated with a PLMN other than a PLMN associated with the UE.

In some examples, the instance of the SIB 410 may be decoded after synchronizing with the base station that transmitted the instance of the DRS 405 and the instance of the SIB 410. In some examples, the UE may synchronize with the base station based at least in part on the PSS 435 and the SSS 440, or based at least in part on a PSS and/or SSS included in a prior instance of the DRS. When synchronizing with the base station based at least in part on the PSS 435 and the SSS 440 in the instance of the DRS 405, the UE may be unable to decode the instance of the SIB 410, but may decode a later instance of the SIB 410.

In some examples, the instance of the DRS 405 may include a first demodulation reference signal (e.g., a DM-RS) or beam reference signal (BRS) that is included in the instance of the DRS 405 due to the presence of the instance of the SIB 410 that is frequency division multiplexed with the instance of the DRS 405. In other examples, the instance of the DRS 405 may include a second demodulation reference signal (e.g., a cell-specific reference signal (CRS)) that is included in each instance of the DRS (i.e., regardless of the presence of the instance of the SIB 410). In other examples, the instance of the DRS 405 may include a combination of demodulation reference signals, or the instance of the SIB 410 may include one or more demodulation reference signals. The demodulation reference signal(s) may be used to decode the instance of the SIB 410, or to perform measurements on a serving cell or neighboring cell.

In some examples, the random access procedure performed at time t1 may be performed based at least in part on random access configuration information included in the instance of the DRS 405 (e.g., in the PBCH 430) or in another instance of the DRS.

The frequency division multiplexing of the instance of the SIB 410 with the instance of the DRS 405 may be used to decouple network acquisition from a random access procedure. That is, the UE may be able to acquire network information from the instance of the SIB 410, prior to performing a random access procedure.

In some examples, the base station may be unable to power boost the instance of the DRS 405 to a maximum transmit power, due to the instance of the DRS 405 that is frequency division multiplexed with the instance of the SIB 410 (assuming a power limited system, but not a power spectral density (PSD) limited system). To enable the base station to power boost (or de-boost) the instance of the DRS 405 relative to the instance of the SIB 410 in a power limited system, the base station may transmit the instance of the DRS 405 and the instance of the SIB 410 according to a DRS-to-SIB transmit power ratio. In some examples, the DRS-to-SIB transmit power ratio may be selected from a plurality of predetermined DRS-to-SIB transmit power ratios. In some examples, the DRS-to-SIB transmit power ratio may be indicated in the instance of the SIB 410 (e.g., in the PBCH 430).

In some examples, the base station that transmits the instance of the DRS 405 and the instance of the SIB 410 may select a LBT priority class for the instance of the DRS 405 based at least in part on the transmission of the instance of the SIB 410. For example, the base station may select a lower LBT priority class for the instance of the DRS 405, based at least in part on the presence of the instance of the SIB 410, but may select a higher LBT priority class for an instance of the DRS that is not frequency division multiplexed with an instance of a SIB. In some examples, the higher LBT priority class may be a LBT priority class that does not require the performance of a LBT procedure (e.g., a CET LBT priority class).

In some examples, the base station may perform a first LBT procedure for the frequency range associated with the instance of the DRS 405 (e.g., for the first frequency range 415), and may perform a second LBT procedure for the frequency range (or ranges) associated with the instance of the SIB 410 (e.g., for the second frequency range 420 and the third frequency range 425). The instance of the DRS 405 may be transmitted based at least in part on the first LBT procedure, and the instance of the DRS 405 may be transmitted based at least in part on the second LBT procedure. In some cases, the instance of the SIB 410 may not be transmitted with the instance of the DRS 405, depending on the outcome of the second LBT procedure. In some examples, each of the first LBT procedure and the second LBT procedure may be based on energy sensing of an associated frequency range.

Figure 5:
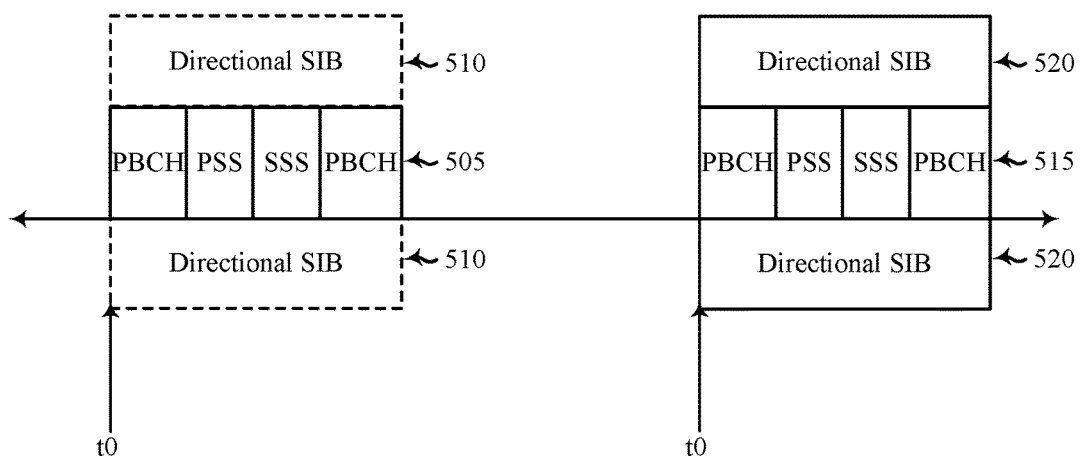
FIGS. 5-7 shows timelines of transmissions over a shared radio frequency spectrum band, in accordance with various aspects of the present disclosure.

FIG. 5 shows a timeline 500 of transmissions over a shared radio frequency spectrum band, in accordance with various aspects of the present disclosure. The transmissions may include transmissions of multiple instances of a DRS and multiple instances of a SIB by a base station. The base station may be an example of aspects of the base stations described with reference to FIG. 1.

At time t0, the base station may transmit a first instance of a DRS 505. The first instance of the DRS 505 may optionally be frequency division multiplexed with a first instance of a SIB 510. At time t1, the base station may transmit a second instance of the DRS 515, frequency division multiplexed with a second instance of the SIB 520. Each of the instances of the DRS and instances of the SIB may be transmitted on a same beam over a shared radio frequency spectrum band. Each of the first instance of the DRS 505 and the second instance of the DRS 515 may be an instance of a directional DRS, as described with reference to FIG. 3, or a directional part of an instance of a multi-beam DRS, as described with reference to FIG. 2. Each instance of the DRS and instance of the SIB may be configured as described with reference to FIG. 4.

In some examples, each of the first instance of the DRS 505 and the second instance of the DRS 515 may include an indication of a transmit power of the instance of the DRS (e.g., an indication of the transmit power of the instance of the DRS relative to a reference power). The indication may reduce ambiguity across measurements of different instances of the DRS, and thus enable a UE to combine the measurements (e.g., by scaling the measurements of different instances of the DRS based at least in part on the indications of the transmit powers of the different instances of the DRS, and combining (e.g., averaging) the measurements). In some examples, an indication of a transmit power of an instance of a DRS may be indicated by two bits that signal a −6 dB, −3 dB, 0 dB, or +3 dB variation from a reference power.

Figure 6:
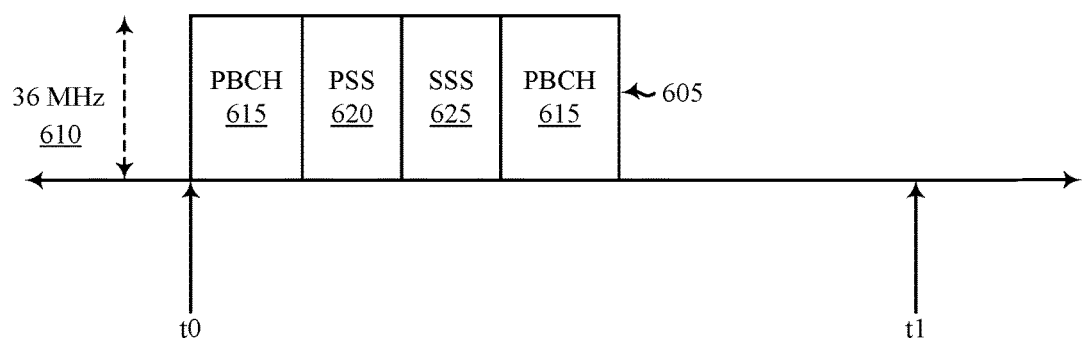

FIG. 6 shows a timeline 600 of transmissions over a shared radio frequency spectrum band, in accordance with various aspects of the present disclosure. The transmissions may include a transmission of an instance of a DRS by a base station, and transmissions by a UE and the base station related to performance of a random access procedure. The base station and UE may be examples of aspects of the base stations and UEs described with reference to FIG. 1.

At time t0, the base station may transmit an instance of a DRS 605. The instance of the DRS 605 may be transmitted on a beam over a shared radio frequency spectrum band. The instance of the DRS 605 may be an instance of a directional DRS, as described with reference to FIG. 3, or a directional part of an instance of a multi-beam DRS, as described with reference to FIG. 2. By way of example, the instance of the DRS 405 is shown to occupy a frequency range 610 (e.g., a 36 MHz frequency range).

The instance of the DRS 605 may include a PBCH 615, a PSS 620, and a SSS 625. In some examples, the PBCH 430 may carry a system frame number, a SS block index, a bandwidth indication, random access configuration information (e.g., RACH information), or a minimum SIB. The timings (or sequential order) of the PBCH 615, the PSS 620, and the SSS 625 may vary. In FIG. 6, the PBCH 615 is shown to be split into portions located before and after the synchronization signals (i.e., the PSS 620 and SSS 625).

A PLMN ID may be hashed with the PBCH 615. In a special case, the full PLMN ID may be included in the PBCH 615. The PLMN ID hashed with the PBCH 615 can enable a UE that receives the instance of the DRS 605 to selectively perform a random access procedure based at least in part on the PLMN ID. For example, the UE may determine that the PLMN ID hashed with the PBCH 615 matches a PLMN ID associated with the UE, and the UE may perform a random access procedure at time t1 to connect with the base station that transmitted the instance of the DRS 605. Alternatively, the UE may determine that the PLMN ID hashed with the PBCH 615 does not match the PLMN ID associated with the UE, and the UE may refrain from performing a random access procedure to connect with the base station that transmitted the instance of the DRS 605. The hashing of the PLMN ID with the PBCH 615 can help a UE to avoid initiating a random access procedure with base stations associated with PLMNs other than a PLMN associated with the UE. When the full PLMN ID is not included in the PBCH 615, the UE may at times initiate a random access procedure with a base station that is not associated with the PLMN ID of the UE; however, the number of such random access procedures may be reduced.

In some examples, the random access procedure performed at time t1 may be performed based at least in part on random access configuration information included in the instance of the DRS 605 (e.g., in the PBCH 615), or in another instance of the DRS.

In contrast to the timelines 400 and 500 shown in FIGS. 4 and 5, the PLMN ID hashing described with reference to FIG. 6 allows the instance of the DRS 605 to be transmitted at a maximum transmit power, and allows transmit power boosting of the instance of the DRS 405. Also in contrast to the timelines 400 and 500 shown in FIGS. 4 and 5, the hashing of the PLMN ID with the instance of the DRS 605 does not decouple network acquisition from a random access procedure. Also, the hashing of the PLMN ID with the PBCH 615 may limit the size of the remaining PBCH.

Figure 7:
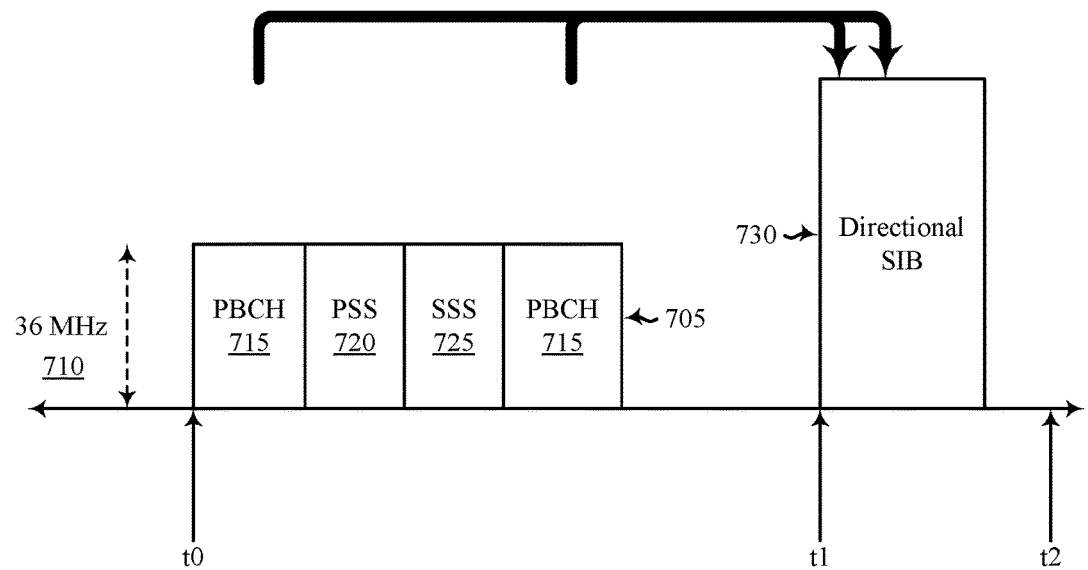

FIG. 7 shows a timeline 700 of transmissions over a shared radio frequency spectrum band, in accordance with various aspects of the present disclosure. The transmissions may include transmissions of an instance of a DRS and an instance of a SIB by a base station, and transmissions by a UE and the base station related to performance of a random access procedure. The base station and UE may be examples of aspects of the base stations and UEs described with reference to FIG. 1.

At time t0, the base station may transmit an instance of a DRS 705. The instance of the DRS 705 may be transmitted on a beam over a shared radio frequency spectrum band. The instance of the DRS 405 may be an instance of a directional DRS, as described with reference to FIG. 3, or a directional part of an instance of a multi-beam DRS, as described with reference to FIG. 2. By way of example, the instance of the DRS 705 is shown to occupy a first frequency range 710 (e.g., a 36 MHz frequency range).

The instance of the DRS 705 may include a PBCH 715, a PSS 720, and a SSS 725. In some examples, the PBCH 430 may carry a system frame number, a SS block index, a bandwidth indication, random access configuration information (e.g., RACH information), or a minimum SIB. The timings (or sequential order) of the PBCH 715, the PSS 720, and the SSS 725 may vary. In FIG. 4, the PBCH 430 is shown to be split into portions located before and after the synchronization signals (i.e., the PSS 435 and SSS 440). The instance of the DRS 705 may also include an indication of a resource location of an instance of a SIB 730 transmitted on the beam. In some examples, the indication of the resource location may include a time window in which a transmission of the instance of the SIB 730 commences. In some examples, the indication of the resource location of the instance of the SIB 730 may be included in the PBCH 715, in Layer 1 signaling associated with the instance of the DRS 705, or in a combination thereof.

The base station may also transmit the instance of the SIB 730 on the beam (e.g., the base station may transmit a directional SIB) at a time t1. The instance of the SIB 730 may be transmitted at the resource location indicated in the instance of the DRS 705. By way of example, the instance of the SIB is shown to occupy a second frequency range that is greater than the first frequency range 710 of the instance of the DRS 705.

The instance of the SIB 730 may include various items of system information, including a PLMN ID associated with the base station that transmits the instance of the DRS 705 and the instance of the SIB 730. The PLMN ID included in the instance of the SIB 730 can enable a UE that receives the instance of the SIB 730 to selectively perform a random access procedure based at least in part on the PLMN ID. For example, the UE may determine that the PLMN ID included in the instance of the SIB 730 matches a PLMN ID associated with the UE, and the UE may perform a random access procedure at time t2 to connect with the base station that transmitted the instance of the DRS 705 and the instance of the SIB 730. Alternatively, the UE may determine that the PLMN ID included in the instance of the SIB 730 does not match the PLMN ID associated with the UE, and the UE may refrain from performing a random access procedure to connect with the base station that transmitted the instance of the DRS 705 and the instance of the SIB 730. The inclusion of the PLMN ID in the instance of the SIB 730 can help a UE avoid initiating a random access procedure with a base station associated with a PLMN other than a PLMN associated with the UE.

In some examples, the random access procedure performed at time t2 may be performed based at least in part on random access configuration information included in the instance of the DRS 705 (e.g., in the PBCH 715) or in another instance of the DRS.

The frequency division multiplexing of the instance of the SIB 410 with the instance of the DRS 405 may be used to decouple network acquisition from a random access procedure. That is, the UE may be able to acquire network information from the instance of the SIB 410, prior to performing a random access procedure.

In contrast to the timelines 400 and 500 shown in FIGS. 4 and 5, the transmission of the instance of the SIB 730 at a different time than the instance of the DRS 705 allows the instance of the DRS 705 to be transmitted at a maximum transmit power, and allows transmit power boosting of the instance of the DRS 705.

In some examples, the instance of the DRS 705 may be part of a multi-beam DRS transmission, and the instance of the SIB 730 may be received as a single beam transmission. In some examples, the instance of the DRS 705 may be transmitted as part of a CET, and the instance of the SIB 730 may be proceeded by a LBT procedure. When the LBT procedure is not successful, the instance of the SIB 730 may not be transmitted, despite its location being indicated in the instance of the DRS 705.

Figure 8:
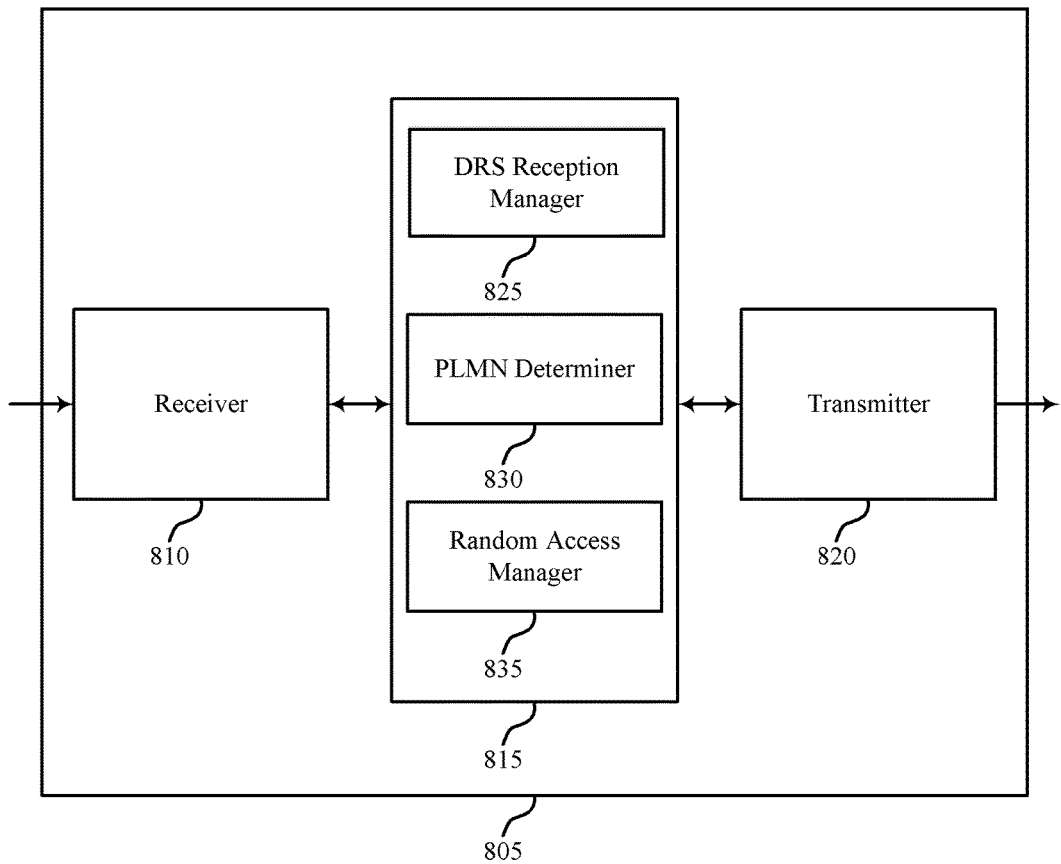
FIG. 8 shows a block diagram of an apparatus for use in wireless communication, in accordance with various aspects of the present disclosure.

FIG. 8 shows a block diagram 800 of an apparatus 805 for use in wireless communication, in accordance with various aspects of the present disclosure. The apparatus 805 may be an example of aspects of a UE described with reference to FIG. 1. The apparatus 805 may include a receiver 810, a wireless communication manager 815, and a transmitter 820. The apparatus 805 may also include a processor. Each of these components may be in communication with one another (e.g., via one or more buses).

The receiver 810 may receive data or control signals or information (i.e., transmissions), some or all of which may be associated with various information channels (e.g., data channels, control channels, etc.). Received signals or information, or measurements performed thereon, may be passed to other components of the apparatus 805. The receiver 810 may include a single antenna or a set of antennas.

The wireless communication manager 815 and/or at least some of its various sub-components may be implemented in hardware, software executed by a processor, firmware, or any combination thereof. If implemented in software executed by a processor, the functions of the wireless communication manager 815 and/or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The wireless communication manager 815 and/or at least some of its various sub-components may be physically located at various positions, including being distributed such that portions of functions are implemented at different physical locations by one or more physical devices. In some examples, the wireless communication manager 815 and/or at least some of its various sub-components may be a separate and distinct component in accordance with various aspects of the present disclosure. In other examples, the wireless communication manager 815 and/or at least some of its various sub-components may be combined with one or more other hardware components, including but not limited to an I/O component, a transceiver, another computing device, one or more other components described in the present disclosure, or a combination thereof, in accordance with various aspects of the present disclosure. The wireless communication manager 815 may be an example of aspects of the wireless communication manager described with reference to FIG. 1. The wireless communication manager 815 may include a DRS reception manager 825, a PLMN determiner 830, and a random access manager 835.

The DRS reception manager 825 may be used to receive an instance of a DRS on a beam over a shared radio frequency spectrum band, as described for example with reference to FIG. 4, 5, 6, or 7.

The PLMN determiner 830 may be used to determine a PLMN ID based at least in part on a time-frequency location of the instance of the DRS, as described for example with reference to FIG. 4, 5, 6, or 7.

The random access manager 835 may be used to selectively perform a random access procedure based at least in part on the determined PLMN ID, as described for example with reference to FIG. 4, 5, 6, or 7.

The transmitter 820 may transmit data or control signals or information (i.e., transmissions) generated by other components of the apparatus 805, some or all of which may be associated with various information channels (e.g., data channels, control channels, etc.). In some examples, the transmitter 820 may be collocated with the receiver 810 in a transceiver. For example, the transmitter 820 and receiver 810 may be an example of aspects of the transceiver 1630 described with reference to FIG. 16. The transmitter 820 may include a single antenna or a set of antennas.

Figure 9:
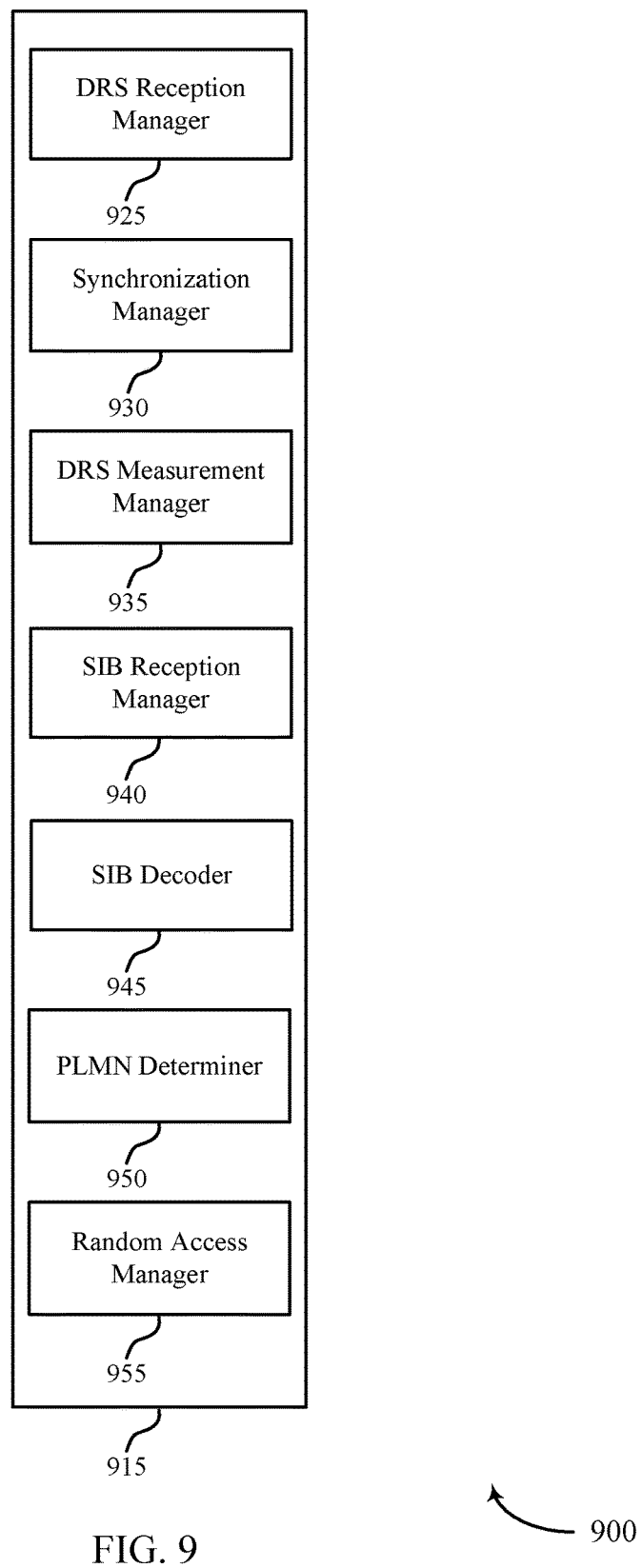
FIGS. 9-11 show block diagrams of wireless communication managers, in accordance with various aspects of the present disclosure.

FIG. 9 shows a block diagram 900 of a wireless communication manager 915, in accordance with various aspects of the present disclosure. The wireless communication manager 915 may be an example of aspects of the wireless communication managers described with reference to FIG. 1 or 8. The wireless communication manager 915 may include a DRS reception manager 925, an optional synchronization manager 930, an optional DRS measurement manager 935, a SIB reception manager 940, a SIB decoder 945, a PLMN determiner 950, and a random access manager 955. Each of these components may communicate, directly or indirectly, with one another (e.g., via one or more buses). The DRS reception manager 825, PLMN determiner 830, and random access manager 835 may be examples of the DRS reception manager 825, PLMN determiner 830, and random access manager 835 described with reference to FIG. 8.

The DRS reception manager 925 may be used to receive a first instance of a DRS on a beam over a shared radio frequency spectrum band, as described for example with reference to FIG. 4 or 5. The DRS reception manager 925 may also be used to receive a second instance of the DRS on the beam. The second instance of the DRS may be received later in time than the first instance of the DRS. In some examples, the first instance of the DRS or second instance of the DRS may include an indication of a transmit power of the instance of the DRS relative to a reference power.

The synchronization manager 930 may be used to synchronize with a base station based at least in part on a set of one or more synchronization signals included in the first instance of the DRS or the second instance of the DRS, as described for example with reference to FIG. 4 or 5.

The DRS measurement manager 935 may be used to measure the first instance of the DRS or the second instance of the DRS, as described for example with reference to FIG. 4 or 5. In some examples, the DRS measurement manager 935 may combine measurements of the first instance of the DRS and the second instance of the DRS based at least in part on the indication of the power of the first instance of the DRS and/or the indication of the power of the second instance of the DRS, as described for example with reference to FIG. 4 or 5.

The SIB reception manager 940 may be used to receive an instance of a SIB on the beam, as described for example with reference to FIG. 4 or 5. The instance of the SIB may be frequency division multiplexed with the second instance of the DRS. In some examples, the second instance of the DRS and the instance of the SIB may be received according to a DRS-to-SIB transmit power ratio, as also described for example with reference to FIG. 4. In some examples, the DRS-to-SIB transmit power ratio may include one of a plurality of predetermined DRS-to-SIB transmit power ratios.

The SIB decoder 945 may be used to decode the instance of the SIB based at least in part on the synchronizing with the base station, as described for example with reference to FIG. 4 or 5. In some examples, the second instance of the DRS may include at least one of a first demodulation reference signal included in the second instance of the DRS due to the presence of the instance of the SIB that is frequency division multiplexed with the second instance of the DRS, a second demodulation reference signal included in each instance of the DRS, or a combination thereof. The instance of the SIB (and included PLMN ID) may be decoded based at least in part on the demodulation reference signal, as described for example with reference to FIG. 4.

The PLMN determiner 950 may be used to determine a PLMN ID based at least in part on a time-frequency location of the second instance of the DRS and based at least in part on the instance of the SIB (e.g., the PLMN ID may be included in the instance of the SIB), as described for example with reference to FIG. 4 or 5.

The random access manager 955 may be used to determine whether the PLMN ID based at least in part on the time-frequency location of the second instance of the DRS matches a second PLMN ID associated with the UE, as described for example with reference to FIG. 7. Upon determining that the PLMN ID based at least in part on the time-frequency location of the second instance of the DRS matches the second PLMN ID associated with the UE, the random access manager 955 may be used to decode random access configuration information included in the first instance of the DRS or another instance of the DRS, and to perform a random access procedure based at least in part on the determined PLMN ID match and the decoded random access configuration information, to connect to a base station, as described for example with reference to FIG. 7. Upon determining that the PLMN ID based at least in part on the time-frequency location of the second instance of the DRS does not match the second PLMN ID associated with the UE, the random access manager 955 may be used to refrain from performing the random access procedure based at least in part on the determined non-match, as described with reference to FIG. 7.

Figure 10:
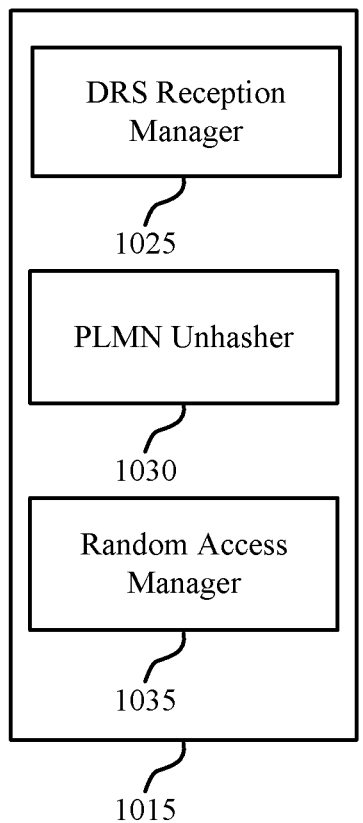

FIG. 10 shows a block diagram 1000 of a wireless communication manager 1015, in accordance with various aspects of the present disclosure. The wireless communication manager 1015 may be an example of aspects of the wireless communication managers described with reference to FIG. 1 or 8. The wireless communication manager 1015 may include a DRS reception manager 1025, a PLMN unhasher 1030, and a random access manager 1035. Each of these components may communicate, directly or indirectly, with one another (e.g., via one or more buses). The DRS reception manager 1025, PLMN unhasher 1030, and random access manager 1035 may be examples of the DRS reception manager 825, PLMN determiner 830, and random access manager 835 described with reference to FIG. 8.

The DRS reception manager 1025 may be used to receive an instance of a DRS on a beam over a shared radio frequency spectrum band, as described for example with reference to FIG. 6.

The PLMN unhasher 1030 may be used to determine a PLMN ID based at least in part on a time-frequency location of the instance of the DRS, as described for example with reference to FIG. 6. In some examples, determining the PLMN ID may include receiving the PLMN ID hashed with a PBCH received in the instance of the DRS.

The random access manager 1035 may be used to determine whether the PLMN ID based at least in part on the time-frequency location of the second instance of the DRS matches a second PLMN ID associated with the UE, as described for example with reference to FIG. 6. Upon determining that the PLMN ID based at least in part on the time-frequency location of the second instance of the DRS matches the second PLMN ID associated with the UE, the random access manager 1035 may be used to decode random access configuration information included in the instance of the DRS or another instance of the DRS, and to perform a random access procedure based at least in part on the determined PLMN ID match and the decoded random access configuration information, to connect to a base station, as described for example with reference to FIG. 6. Upon determining that the PLMN ID based at least in part on the time-frequency location of the second instance of the DRS does not match the second PLMN ID associated with the UE, the random access manager 1035 may be used to refrain from performing the random access procedure based at least in part on the determined non-match, as described with reference to FIG. 6.

Figure 11:
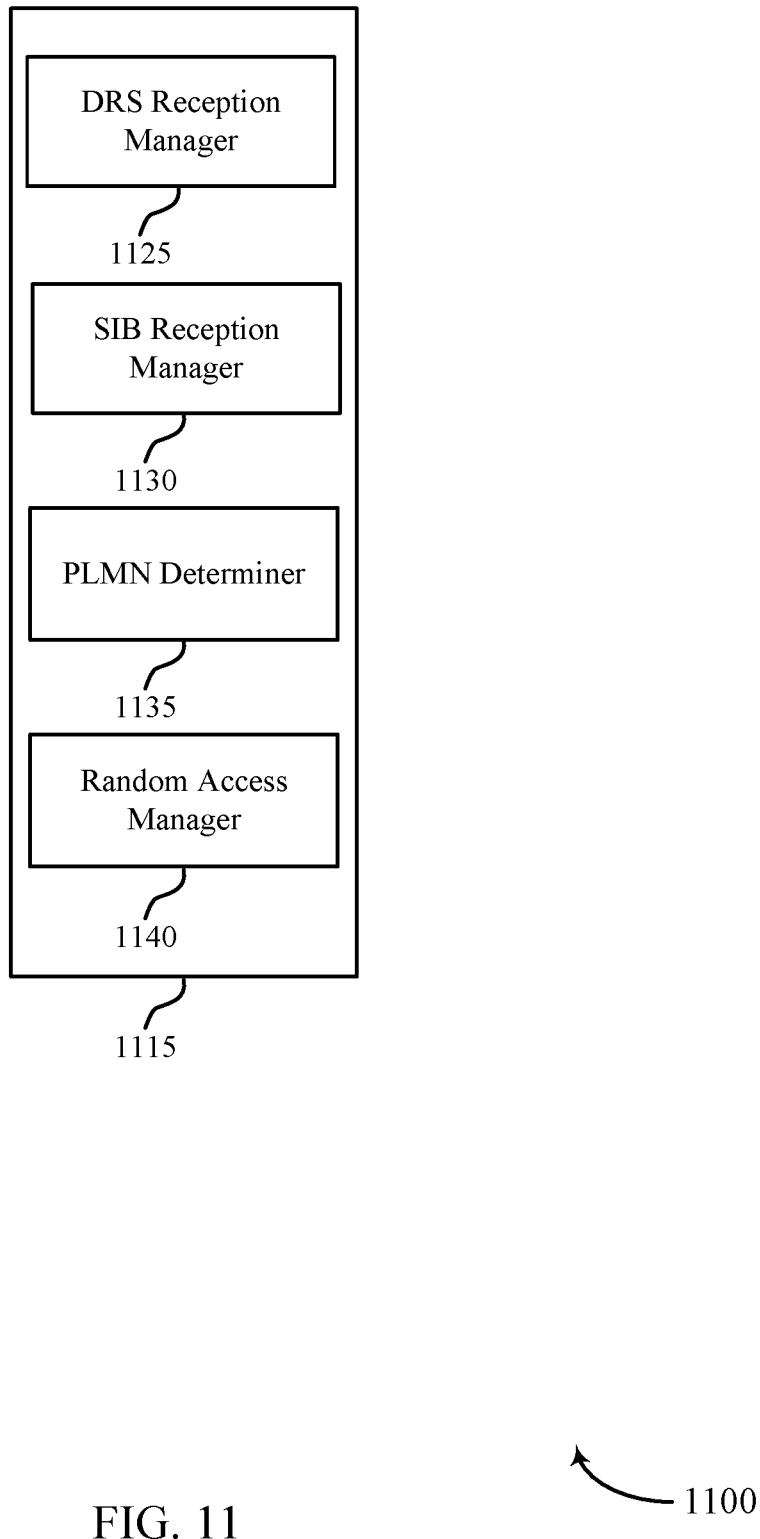

FIG. 11 shows a block diagram 1100 of a wireless communication manager 1115, in accordance with various aspects of the present disclosure. The wireless communication manager 1115 may be an example of aspects of the wireless communication managers described with reference to FIG. 1 or 8. The wireless communication manager 1115 may include a DRS reception manager 1125, a SIB reception manager 1130, a PLMN determiner 1135, and a random access manager 1140. Each of these components may communicate, directly or indirectly, with one another (e.g., via one or more buses). The DRS reception manager 1125, PLMN determiner 1135, and random access manager 1140 may be examples of the DRS reception manager 825, PLMN determiner 830, and random access manager 835 described with reference to FIG. 8.

The DRS reception manager 1125 may be used to receive an instance of a DRS on a beam over a shared radio frequency spectrum band, as described for example with reference to FIG. 7. The instance of the DRS may include an indication of a resource location of a SIB transmitted on the beam. In some examples, the resource location may include a time window in which a transmission of the instance of the SIB commences. In some examples, the indication of the resource location of the instance of the SIB may be included in at least one of a PBCH received in the instance of the DRS, Layer 1 signaling associated with the instance of the DRS, or a combination thereof.

The SIB reception manager 1130 may be used to receive the instance of the SIB on the beam at the indicated resource location, as described for example with reference to FIG. 7. In some examples, the instance of the DRS may be part of a multi-beam DRS transmission, and the instance of the SIB may be received as a single beam transmission.

The PLMN determiner 1135 may be used to determine a PLMN ID based at least in part on a time-frequency location of the instance of the DRS (e.g., based at least in part on the indication of the resource location of the instance of the SIB included in the instance of the DRS) and based at least in part on the instance of the SIB (e.g., the PLMN ID may be included in the instance of the SIB), as described for example with reference to FIG. 7.

The random access manager 1140 may be used to determine whether the PLMN ID based at least in part on the time-frequency location of the second instance of the DRS matches a second PLMN ID associated with the UE, as described for example with reference to FIG. 7. Upon determining that the PLMN ID based at least in part on the time-frequency location of the second instance of the DRS matches the second PLMN ID associated with the UE, the random access manager 1140 may be used to decode random access configuration information included in the instance of the DRS or another instance of the DRS, and to perform a random access procedure based at least in part on the determined PLMN ID match and the decoded random access configuration information, to connect to a base station, as described for example with reference to FIG. 7. Upon determining that the PLMN ID based at least in part on the time-frequency location of the second instance of the DRS does not match the second PLMN ID associated with the UE, the random access manager 1140 may be used to refrain from performing the random access procedure based at least in part on the determined non-match, as described with reference to FIG. 7.

Figure 12:
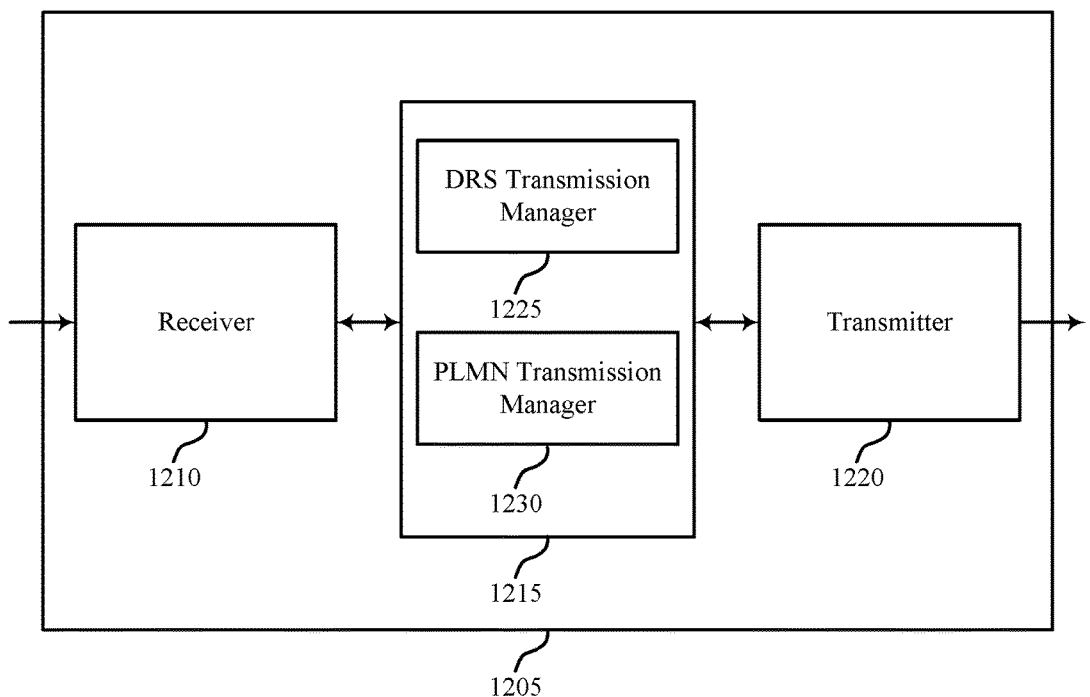
FIG. 12 shows a block diagram of an apparatus for use in wireless communication, in accordance with various aspects of the present disclosure.

FIG. 12 shows a block diagram 1200 of an apparatus 1205 for use in wireless communication, in accordance with various aspects of the present disclosure. The apparatus 1205 may be an example of aspects of a UE described with reference to FIG. 1. The apparatus 1205 may include a receiver 1210, a wireless communication manager 1215, and a transmitter 1220. The apparatus 1205 may also include a processor. Each of these components may be in communication with one another (e.g., via one or more buses).

The receiver 1210 may receive data or control signals or information (i.e., transmissions), some or all of which may be associated with various information channels (e.g., data channels, control channels, etc.). Received signals or information, or measurements performed thereon, may be passed to other components of the apparatus 1205. The receiver 1210 may include a single antenna or a set of antennas.

The wireless communication manager 1215 and/or at least some of its various sub-components may be implemented in hardware, software executed by a processor, firmware, or any combination thereof. If implemented in software executed by a processor, the functions of the wireless communication manager 1215 and/or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The wireless communication manager 1215 and/or at least some of its various sub-components may be physically located at various positions, including being distributed such that portions of functions are implemented at different physical locations by one or more physical devices. In some examples, the wireless communication manager 1215 and/or at least some of its various sub-components may be a separate and distinct component in accordance with various aspects of the present disclosure. In other examples, the wireless communication manager 1215 and/or at least some of its various sub-components may be combined with one or more other hardware components, including but not limited to an I/O component, a transceiver, another computing device, one or more other components described in the present disclosure, or a combination thereof, in accordance with various aspects of the present disclosure. The wireless communication manager 1215 may be an example of aspects of the wireless communication manager described with reference to FIG. 1. The wireless communication manager 1215 may include a DRS transmission manager 1225 or a PLMN transmission manager 1230.

The DRS transmission manager 1225 may be used to transmit an instance of a DRS on a beam over a shared radio frequency spectrum band, as described for example with reference to FIG. 4, 5, 6, or 7.

The PLMN transmission manager 1230 may be used to transmit a PLMN ID based at least in part on a time-frequency location of the DRS, as described for example with reference to FIG. 4, 5, 6, or 7.

The transmitter 1220 may transmit data or control signals or information (i.e., transmissions) generated by other components of the apparatus 1205, some or all of which may be associated with various information channels (e.g., data channels, control channels, etc.). In some examples, the transmitter 1220 may be collocated with the receiver 1210 in a transceiver. For example, the transmitter 1220 and receiver 1210 may be an example of aspects of the transceiver 1750 described with reference to FIG. 17. The transmitter 1220 may include a single antenna or a set of antennas.

Figure 13:
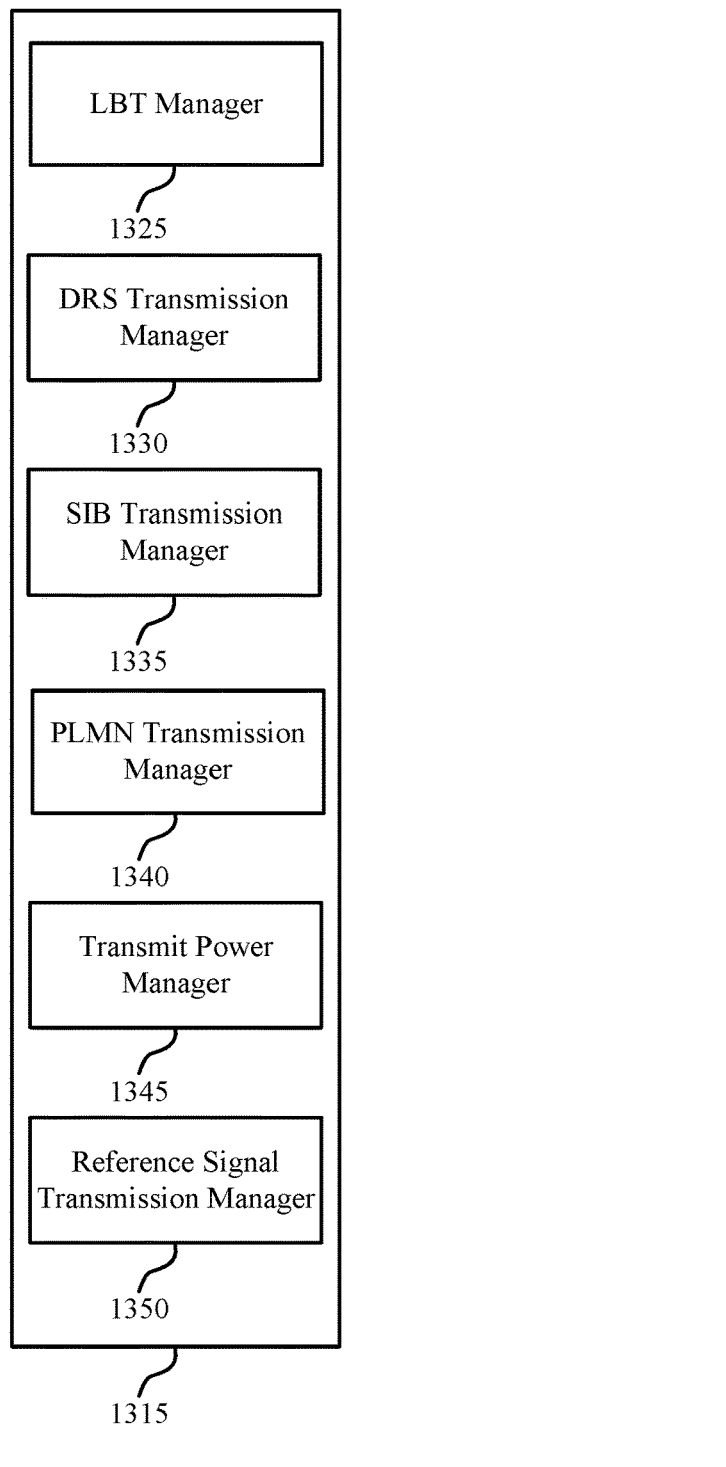
FIGS. 13-15 show block diagrams of wireless communication managers, in accordance with various aspects of the present disclosure.

FIG. 13 shows a block diagram 1300 of a wireless communication manager 1315, in accordance with various aspects of the present disclosure. The wireless communication manager 1315 may be an example of aspects of the wireless communication managers described with reference to FIG. 1 or 12. The wireless communication manager 1315 may include an optional LBT manager 1325, a DRS transmission manager 1330, a SIB transmission manager 1335, a PLMN transmission manager 1340, an optional transmit power manager 1345, and an optional reference signal transmission manager 1350. Each of these components may communicate, directly or indirectly, with one another (e.g., via one or more buses). The DRS transmission manager 1330 or PLMN transmission manager 1340 may be examples of the DRS transmission manager 1225 or PLMN transmission manager 1230 described with reference to FIG. 12

The LBT manager 1325 may be used to perform a first LBT procedure for a first frequency range associated with an instance of a DRS, and a second LBT procedure for a second frequency range associated with an instance of a SIB, as described for example with reference to FIG. 4 or 5.

The DRS transmission manager 1330 may be used to transmit the instance of the DRS on a beam over a shared radio frequency spectrum band, as described for example with reference to FIG. 4 or 5. In some examples, the instance of the DRS may be transmitted based at least in part on the first LBT procedure. In some examples, the instance of the DRS may be a second instance of the DRS, and the DRS transmission manager 1330 may further transmit a first instance of the DRS. Each of the first instance of the DRS and the second instance of the DRS may include a set of one or more synchronization signals for synchronizing with the base station.

The SIB transmission manager 1335 may be used to transmit an instance of a SIB on the beam. The instance of the SIB may be frequency division multiplexed with the instance of the DRS, as described for example with reference to FIG. 4 or 5. In some examples, the instance of the SIB may be transmitted based at least in part on the second LBT procedure.

The PLMN transmission manager 1340 may be used to transmit a PLMN ID based at least in part on a time-frequency location of the DRS (e.g., in the instance of the SIB), as described for example with reference to FIG. 4 or 5.

The transmit power manager 1345 may be used to select a transmit power for the instance of the DRS, and to transmit, in the instance of the DRS, an indication of the transmit power of the instance of the DRS relative to a reference power, as described for example with reference to FIG. 4. In some examples, the transmit power manager 1345 may transmit the instance of the DRS and the instance of the SIB according to a DRS-to-SIB transmit power ratio, as also described for example with reference to FIG. 4. In some examples, the transmit power manager 1345 may select the DRS-to-SIB transmit power ratio from a plurality of predetermined DRS-to-SIB transmit power ratios.

The reference signal transmission manager 1350 may be used to transmit, in the instance of the DRS, at least one of a first demodulation reference signal included in the instance of the DRS due to the presence of the instance of the SIB that is frequency division multiplexed with the instance of the DRS, a second demodulation reference signal included in each instance of the DRS, or a combination thereof. The transmitted reference signal may be used by a UE to decode the instance of the SIB, as described for example with reference to FIG. 4.

The LBT manager 1325 may also be used to select a LBT priority class for the instance of the DRS based at least in part on the transmission of the instance of the SIB that is frequency division multiplexed with the instance of the DRS.

Figure 14:
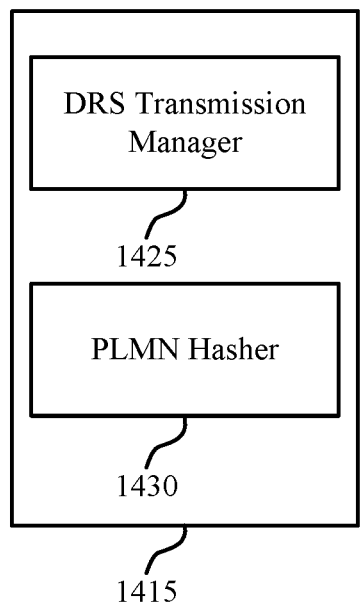

FIG. 14 shows a block diagram 1400 of a wireless communication manager 1415, in accordance with various aspects of the present disclosure. The wireless communication manager 1415 may be an example of aspects of the wireless communication managers described with reference to FIG. 1 or 12. The wireless communication manager 1415 may include a DRS transmission manager 1425 and a PLMN hasher 1430. Each of these components may communicate, directly or indirectly, with one another (e.g., via one or more buses). The DRS transmission manager 1425 or PLMN hasher 1430 may be examples of the DRS transmission manager 1225 or PLMN transmission manager 1230 described with reference to FIG. 12.

The DRS transmission manager 1425 may be used to transmit an instance of a DRS on a beam over a shared radio frequency spectrum band, as described for example with reference to FIG. 6.

The PLMN hasher 1430 may be used to transmit a PLMN ID based at least in part on a time-frequency location of the DRS, as described for example with reference to FIG. 6. In some examples, transmitting the PLMN ID may include transmitting the PLMN ID hashed with a PBCH transmitted in the instance of the DRS.

Figure 15:
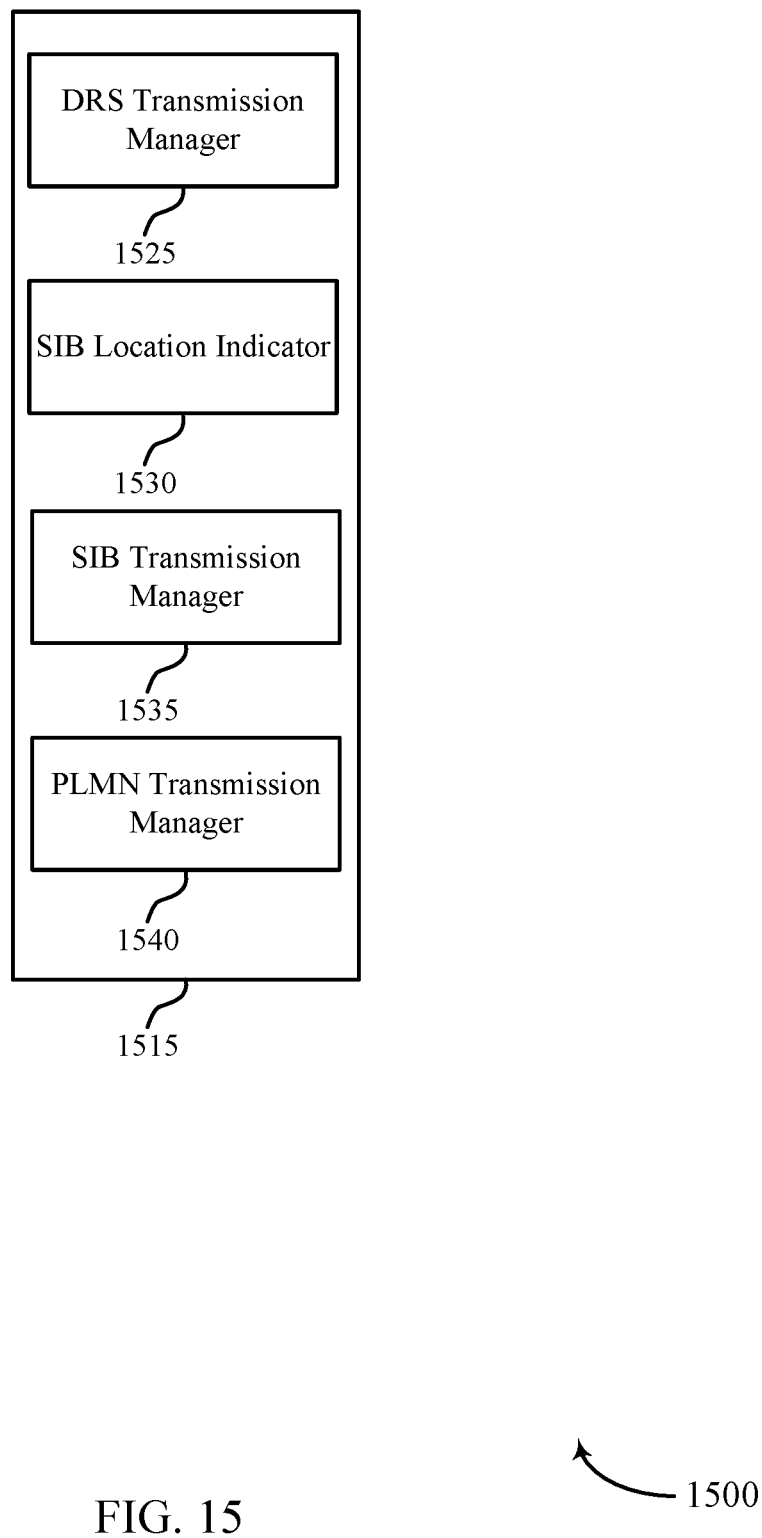

FIG. 15 shows a block diagram 1500 of a wireless communication manager 1515, in accordance with various aspects of the present disclosure. The wireless communication manager 1515 may be an example of aspects of the wireless communication managers described with reference to FIG. 1 or 12. The wireless communication manager 1515 may include a DRS transmission manager 1525, a SIB location indicator 1530, a SIB transmission manager 1535, and a PLMN transmission manager 1540. Each of these components may communicate, directly or indirectly, with one another (e.g., via one or more buses). The DRS transmission manager 1525 or PLMN transmission manager 1540 may be examples of the DRS transmission manager 1225 or PLMN transmission manager 1230 described with reference to FIG. 12.

The DRS transmission manager 1525 may be used to transmit an instance of a DRS on a beam over a shared radio frequency spectrum band, as described for example with reference to FIG. 7. In some examples, the instance of the DRS may be part of a multi-beam DRS transmission.

The SIB location indicator 1530 may be used to transmit, in the instance of the DRS, an indication of a resource location of a SIB transmitted on the beam, as described for example with reference to FIG. 7. In some examples, the indication of the resource location may include an indication of a time window in which a transmission of the instance of the SIB commences. In some examples, the resource location of the instance of the SIB may be transmitted in at least one of a PBCH transmitted in the instance of the DRS, Layer 1 signaling associated with the instance of the DRS, or a combination thereof.

The SIB transmission manager 1535 may be used to transmit the instance of the SIB at the indicated resource location, as described for example with reference to FIG. 7. In some examples, the instance of the SIB may be transmitted subject to completion of a LBT procedure. In some examples, the instance of the SIB may be transmitted frequency division multiplexed with a directional DRS transmission.

The PLMN transmission manager 1540 may be used to transmit a PLMN ID based at least in part on a time-frequency location of the DRS (e.g., in the instance of the SIB transmitted at the resource location indicated in the DRS), as described with reference to FIG. 7.

Figure 16:
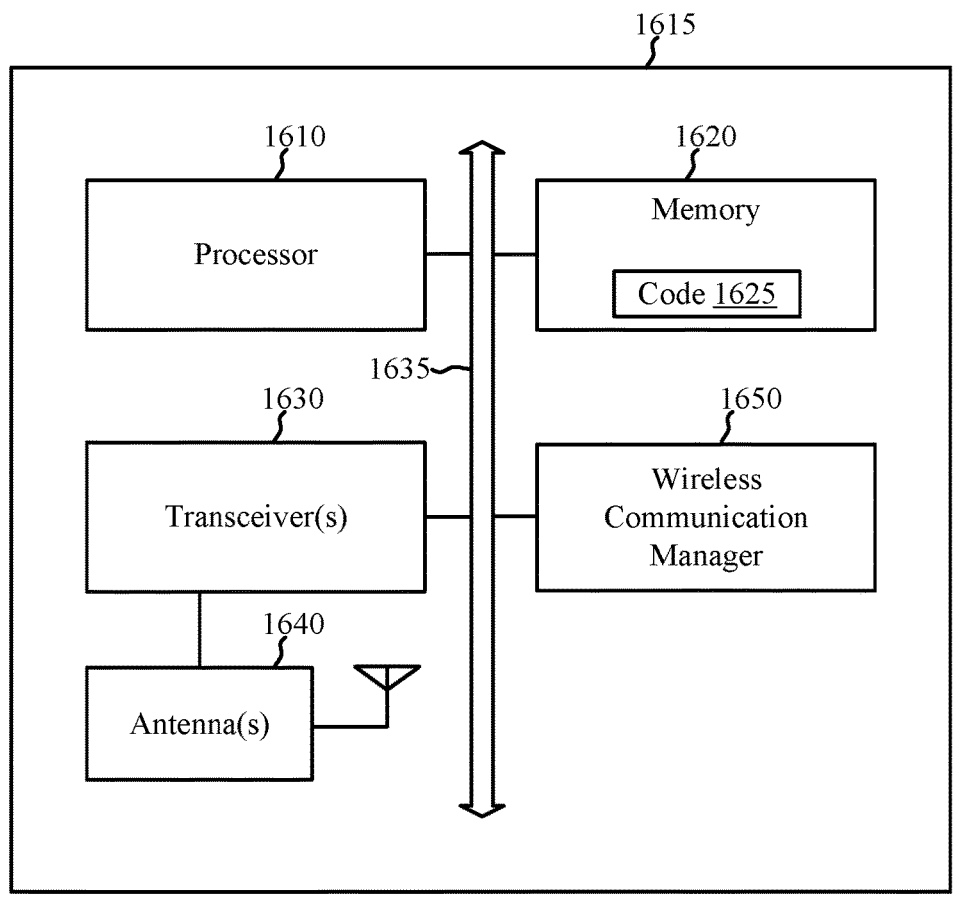
FIG. 16 shows a block diagram of a user equipment (UE) for use in wireless communication, in accordance with various aspects of the present disclosure.

FIG. 16 shows a block diagram 1600 of a UE 1615 for use in wireless communication, in accordance with various aspects of the present disclosure. The UE 1615 may be included or be part of a personal computer (e.g., a laptop computer, a netbook computer, a tablet computer, etc.), a cellular telephone, a PDA, a digital video recorder (DVR), an internet appliance, a gaming console, an e-reader, a vehicle, a home appliance, a lighting or alarm control system, etc. The UE 1615 may, in some examples, have an internal power supply (not shown), such as a small battery, to facilitate mobile operation. In some examples, the UE 1615 may be an example of aspects of one or more of the UEs described with reference to FIG. 1, or aspects of the apparatus described with reference to FIG. 8. The UE 1615 may be configured to implement at least some of the UE or apparatus techniques or functions described with reference to FIG. 1, 2, 3, 4, 5, 6, 7, 8, 9, 10, or 11.

The UE 1615 may include a processor 1610, a memory 1620, at least one transceiver (represented by transceiver(s) 1630), antennas 1640 (e.g., an antenna array), or a wireless communication manager 1650. Each of these components may be in communication with each other, directly or indirectly, over one or more buses 1635.

The memory 1620 may include random access memory (RAM) or read-only memory (ROM). The memory 1620 may store computer-readable, computer-executable code 1625 containing instructions that are configured to, when executed, cause the processor 1610 to perform various functions described herein related to wireless communication, including, for example, selectively performing a random access procedure based at least in part on a PLMN ID determined based at least in part on a time-frequency location of an instance of a DRS received on a beam over a shared radio frequency spectrum band. Alternatively, the computer-executable code 1625 may not be directly executable by the processor 1610 but be configured to cause the UE 1615 (e.g., when compiled and executed) to perform various functions described herein.

The processor 1610 may include an intelligent hardware device, e.g., a central processing unit (CPU), a microcontroller, an ASIC, etc. The processor 1610 may process information received through the transceiver(s) 1630 or information to be sent to the transceiver(s) 1630 for transmission through the antennas 1640. The processor 1610 may handle, alone or in connection with the wireless communication manager 1650, one or more aspects of communicating over (or managing communications over) one or more radio frequency spectrum bands.

The transceiver(s) 1630 may include a modem configured to modulate packets and provide the modulated packets to the antennas 1640 for transmission, and to demodulate packets received from the antennas 1640. The transceiver(s) 1630 may, in some examples, be implemented as one or more transmitters and one or more separate receivers. The transceiver(s) 1630 may support communications in one or more radio frequency spectrum bands. The transceiver(s) 1630 may be configured to communicate bi-directionally, via the antennas 1640, with one or more base stations or apparatuses, such as one or more of the base stations or apparatus described with reference to FIG. 1 or 12.

The wireless communication manager 1650 may be configured to perform or control some or all of the UE or apparatus techniques or functions described with reference to FIG. 1, 2, 3, 4, 5, 6, 7, 8, 9, 10, or 11 related to wireless communication. The wireless communication manager 1650, or portions of it, may include a processor, or some or all of the functions of the wireless communication manager 1650 may be performed by the processor 1610 or in connection with the processor 1610. In some examples, the wireless communication manager 1650 may be an example of the wireless communication manager described with reference to FIG. 1, 8, 9, 10, or 11.

Figure 17:
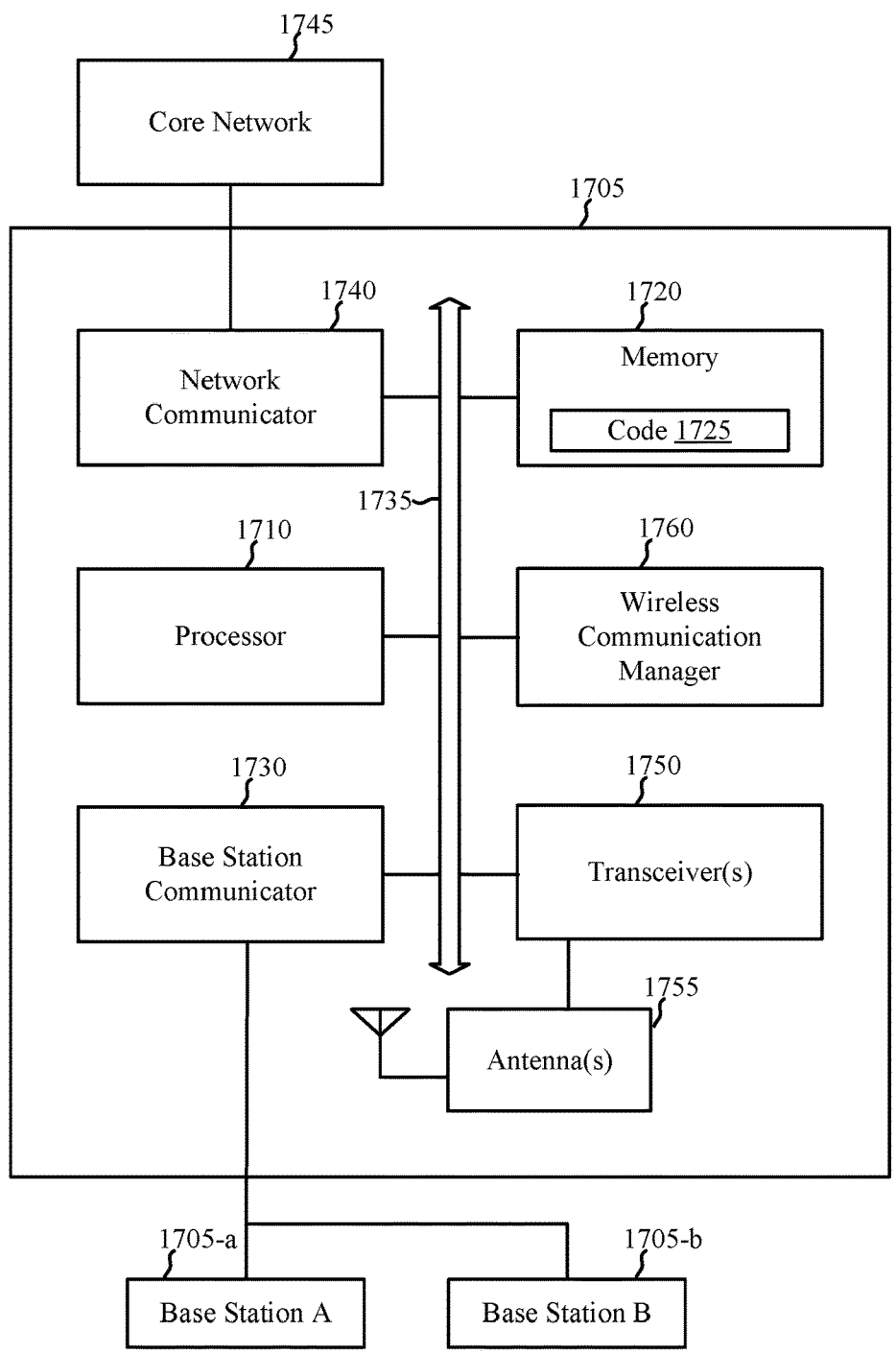
FIG. 17 shows a block diagram of a base station for use in wireless communication, in accordance with various aspects of the present disclosure.

FIG. 17 shows a block diagram 1700 of a base station 1705 for use in wireless communication, in accordance with various aspects of the present disclosure. In some examples, the base station 1705 may be an example of one or more aspects of the base stations (e.g., a radio head, a base station, an eNB, or an ANC) described with reference to FIG. 1, or aspects of the apparatus described with reference to FIG. 12. The base station 1705 may be configured to implement or facilitate at least some of the base station or apparatus techniques or functions described with reference to FIG. 1, 2, 3, 4, 5, 6, 7, 12, 13, 14, or 15.

The base station 1705 may include a processor 1710, a memory 1720, at least one transceiver (represented by transceiver(s) 1750), at least one antenna 1755 (e.g., an antenna array), or a wireless communication manager 1760. The base station 1705 may also include one or more of a base station communicator 1730 or a network communicator 1740. Each of these components may be in communication with each other, directly or indirectly, over one or more buses 1735.

The memory 1720 may include RAM or ROM. The memory 1720 may store computer-readable, computer-executable code 1725 containing instructions that are configured to, when executed, cause the processor 1710 to perform various functions described herein related to wireless communication, including, for example, transmitting a PLMN ID based at least in part on a time-frequency location of an instance of a DRS transmitted on a beam over a radio frequency spectrum band. Alternatively, the computer-executable code 1725 may not be directly executable by the processor 1710 but be configured to cause the base station 1705 (e.g., when compiled and executed) to perform various functions described herein.

The processor 1710 may include an intelligent hardware device, e.g., a CPU, a microcontroller, an ASIC, etc. The processor 1710 may process information received through the transceiver(s) 1750, the base station communicator 1730, or the network communicator 1740. The processor 1710 may also process information to be sent to the transceiver(s) 1750 for transmission through the antennas 1755, or to the base station communicator 1730 for transmission to one or more other base stations (e.g., base station 1705-*a* and base station 1705-*b*), or to the network communicator 1740 for transmission to a core network 1745, which may be an example of one or more aspects of the core network 130 described with reference to FIG. 1. The processor 1710 may handle, alone or in connection with the wireless communication manager 1760, one or more aspects of communicating over (or managing communications over) one or more radio frequency spectrum bands.

The transceiver(s) 1750 may include a modem configured to modulate packets and provide the modulated packets to the antennas 1755 for transmission, and to demodulate packets received from the antennas 1755. The transceiver(s) 1750 may, in some examples, be implemented as one or more transmitters and one or more separate receivers. The transceiver(s) 1750 may support communications in one or more radio frequency spectrum bands. The transceiver(s) 1750 may be configured to communicate bi-directionally, via the antennas 1755, with one or more UEs or apparatuses, such as one or more of the UEs or apparatus described with reference to FIG. 1, 8, or 16. The base station 1705 may communicate with the core network 1745 through the network communicator 1740. The base station 1705 may also communicate with other base stations, such as the base station 1705-*a* and the base station 1705-*b*, using the base station communicator 1730.

The wireless communication manager 1760 may be configured to perform or control some or all of the base station or apparatus techniques or functions described with reference to FIG. 1, 2, 3, 4, 5, 6, 7, 12, 13, 14, or 15 related to wireless communication. The wireless communication manager 1760, or portions of it, may include a processor, or some or all of the functions of the wireless communication manager 1760 may be performed by the processor 1710 or in connection with the processor 1710. In some examples, the wireless communication manager 1760 may be an example of the wireless communication manager described with reference to FIG. 1, 12, 13, 14, or 15.

Figure 18:
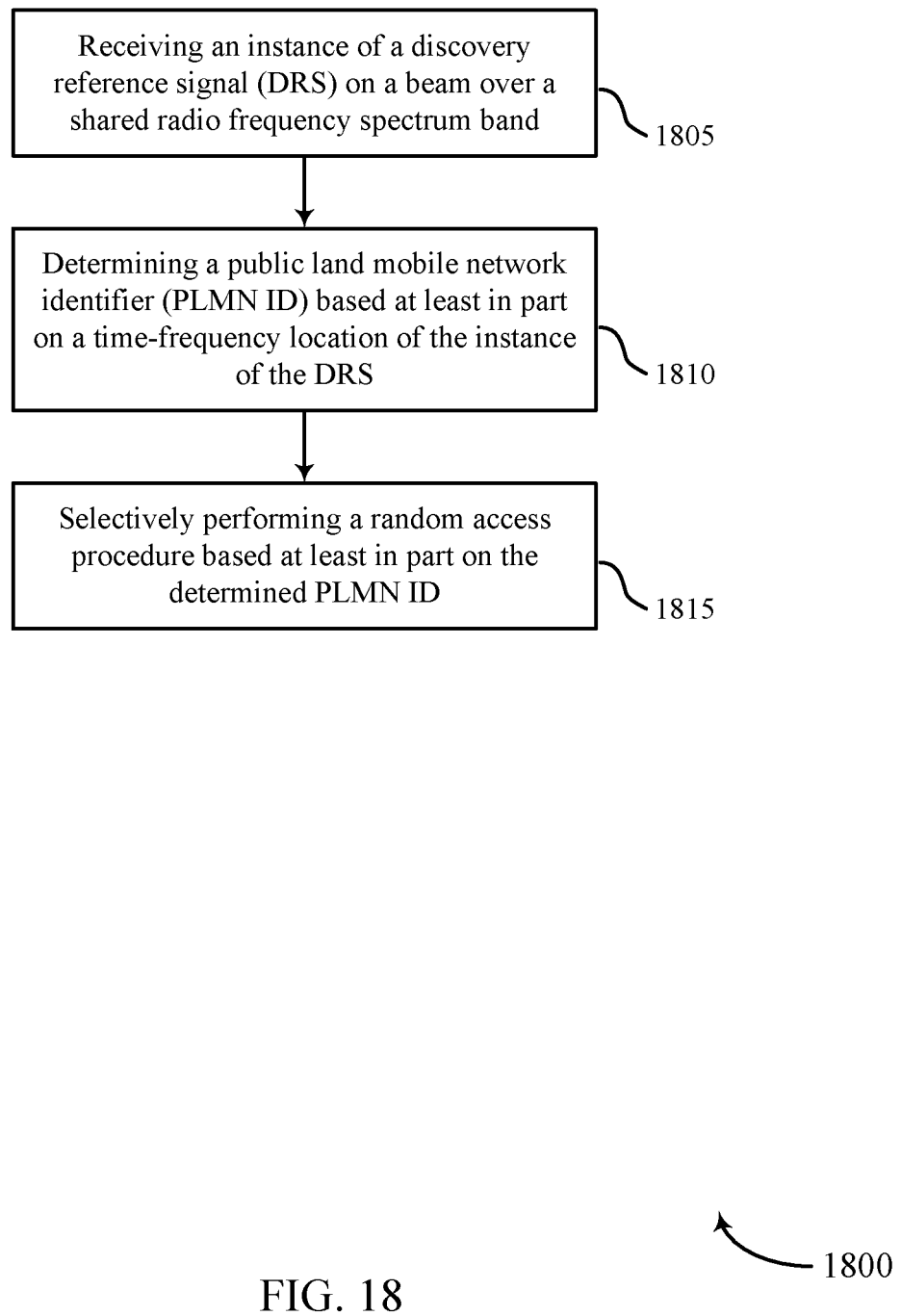
FIGS. 18-23 are flow charts illustrating examples of methods for wireless communication at a UE, in accordance with various aspects of the present disclosure.

FIG. 18 is a flow chart illustrating an example of a method 1800 for wireless communication at a UE, in accordance with various aspects of the present disclosure. For clarity, the method 1800 is described below with reference to aspects of one or more of the UEs described with reference to FIG. 1 or 16, aspects of the apparatus described with reference to FIG. 8, or aspects of one or more of the wireless communication managers described with reference to FIG. 1, 8, 9, 10, 11, or 16. In some examples, a UE may execute one or more sets of codes to control the functional elements of the UE to perform the functions described below. Additionally or alternatively, the UE may perform one or more of the functions described below using special-purpose hardware.

At block 1805, the method 1800 may include receiving an instance of a DRS on a beam over a shared radio frequency spectrum band, as described for example with reference to FIG. 4, 5, 6, or 7. In some examples, the operation(s) at block 1805 may be performed using the DRS reception manager described with reference to FIG. 8, 9, 10, or 11.

At block 1810, the method 1800 may include determining a PLMN ID based at least in part on a time-frequency location of the instance of the DRS, as described for example with reference to FIG. 4, 5, 6, or 7. In some examples, the operation(s) at block 1810 may be performed using the PLMN determiner described with reference to FIG. 8, 9, 10, or 11.

At block 1815, the method 1800 may include selectively performing a random access procedure based at least in part on the determined PLMN ID, as described for example with reference to FIG. 4, 5, 6, or 7. In some examples, the operation(s) at block 1815 may be performed using the random access manager described with reference to FIG. 8, 9, 10, or 11.

Figure 19:
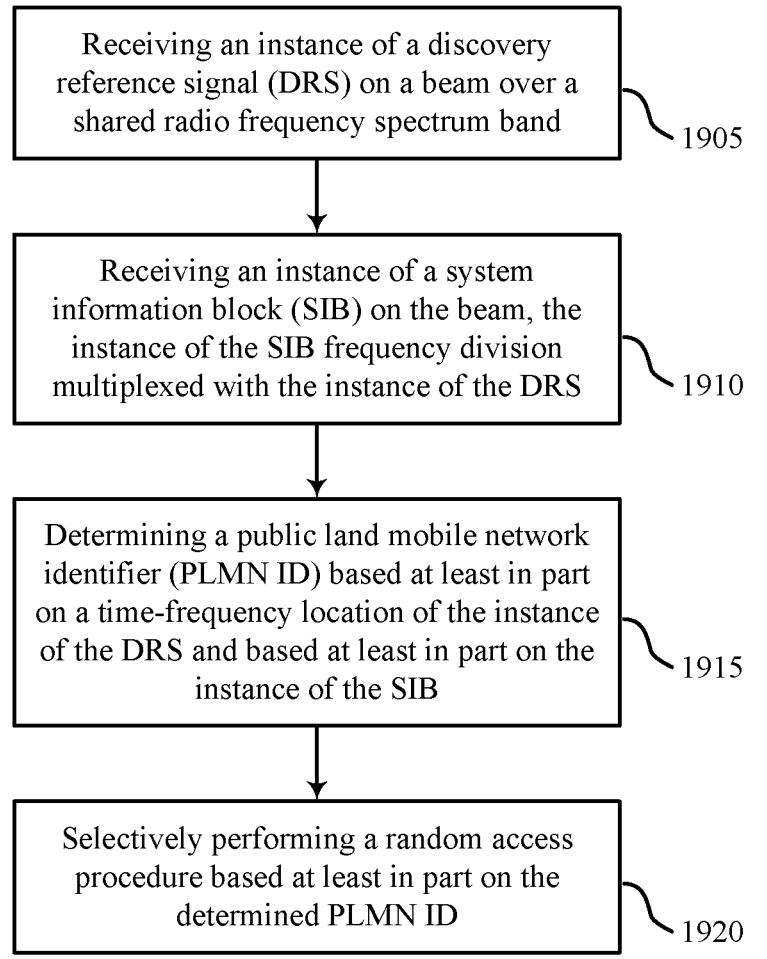

FIG. 19 is a flow chart illustrating an example of a method 1900 for wireless communication at a UE, in accordance with various aspects of the present disclosure. For clarity, the method 1900 is described below with reference to aspects of one or more of the UEs described with reference to FIG. 1 or 16, aspects of the apparatus described with reference to FIG. 8, or aspects of one or more of the wireless communication managers described with reference to FIG. 1, 8, 9, or 16. In some examples, a UE may execute one or more sets of codes to control the functional elements of the UE to perform the functions described below. Additionally or alternatively, the UE may perform one or more of the functions described below using special-purpose hardware.

At block 1905, the method 1900 may include receiving an instance of a DRS on a beam over a shared radio frequency spectrum band, as described for example with reference to FIG. 4 or 5. In some examples, the operation(s) at block 1905 may be performed using the DRS reception manager described with reference to FIG. 8 or 9.

At block 1910, the method 1900 may include receiving an instance of a SIB on the beam, as described for example with reference to FIG. 4 or 5. The instance of the SIB may be frequency division multiplexed with the instance of the DRS. In some examples, the operation(s) at block 1910 may be performed using the SIB reception manager described with reference to FIG. 9.

At block 1915, the method 1900 may include determining a PLMN ID based at least in part on a time-frequency location of the instance of the DRS and based at least in part on the instance of the SIB (e.g., the PLMN ID may be included in the instance of the SIB), as described for example with reference to FIG. 4 or 5. In some examples, the operation(s) at block 1915 may be performed using the PLMN determiner described with reference to FIG. 8 or 9.

At block 1920, the method 1900 may include selectively performing a random access procedure based at least in part on the determined PLMN ID, as described for example with reference to FIG. 4 or 5. In some examples, the operation(s) at block 1920 may be performed using the random access manager described with reference to FIG. 8 or 9.

In some examples of the method 1900, the instance of the DRS may include an indication of a transmit power of the instance of the DRS relative to a reference power, as described for example with reference to FIG. 4. In some examples, the instance of the DRS and the instance of the SIB may be received according to a DRS-to-SIB transmit power ratio, as also described for example with reference to FIG. 4. In some examples, the DRS-to-SIB transmit power ratio may include one of a plurality of predetermined DRS-to-SIB transmit power ratios.

In some examples of the method 1900, the instance of the DRS may include at least one of a first demodulation reference signal included in the instance of the DRS due to the presence of the instance of the SIB that is frequency division multiplexed with the instance of the DRS, a second demodulation reference signal included in each instance of the DRS, or a combination thereof. The instance of the SIB (and included PLMN ID) may be decoded based at least in part on the demodulation reference signal, as described for example with reference to FIG. 4.

Figure 20:
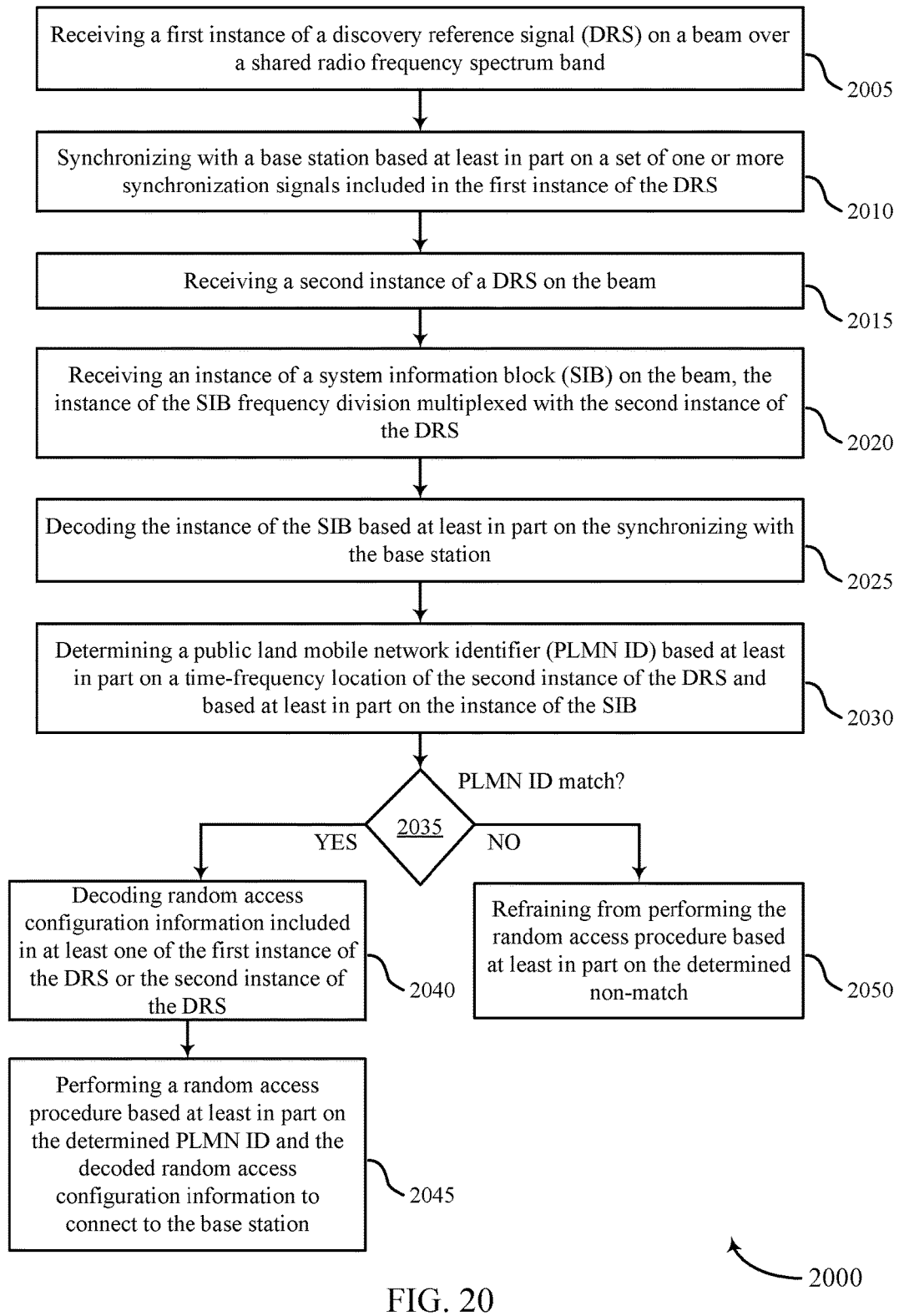

FIG. 20 is a flow chart illustrating an example of a method 2000 for wireless communication at a UE, in accordance with various aspects of the present disclosure. For clarity, the method 2000 is described below with reference to aspects of one or more of the UEs described with reference to FIG. 1 or 16, aspects of the apparatus described with reference to FIG. 8, or aspects of one or more of the wireless communication managers described with reference to FIG. 1, 8, 9, or 16. In some examples, a UE may execute one or more sets of codes to control the functional elements of the UE to perform the functions described below. Additionally or alternatively, the UE may perform one or more of the functions described below using special-purpose hardware.

At block 2005, the method 2000 may include receiving a first instance of a DRS on a beam over a shared radio frequency spectrum band, as described for example with reference to FIG. 4 or 5. In some examples, the operation(s) at block 2005 may be performed using the DRS reception manager described with reference to FIG. 8 or 9.

At block 2010, the method 2000 may include synchronizing with a base station based at least in part on a set of one or more synchronization signals included in the first instance of the DRS, as described for example with reference to FIG. 4 or 5. In some examples, the operation(s) at block 2010 may be performed using the synchronization manager described with reference to FIG. 9.

At block 2015, the method 2000 may include receiving a second instance of a DRS on the beam, as described for example with reference to FIG. 4 or 5. In some examples, the operation(s) at block 2015 may be performed using the DRS reception manager described with reference to FIG. 8 or 9.

At block 2020, the method 2000 may include receiving an instance of a SIB on the beam, as described for example with reference to FIG. 4 or 5. The instance of the SIB may be frequency division multiplexed with the second instance of the DRS. In some examples, the operation(s) at block 2020 may be performed using the SIB reception manager described with reference to FIG. 9.

At block 2025, the method 2000 may include decoding the instance of the SIB based at least in part on the synchronizing with the base station, as described for example with reference to FIG. 4 or 5. In some examples, the operation(s) at block 2025 may be performed using the SIB decoder described with reference to FIG. 9.

At block 2030, the method 2000 may include determining a PLMN ID based at least in part on a time-frequency location of the second instance of the DRS and based at least in part on the instance of the SIB (e.g., the PLMN ID may be included in the instance of the SIB), as described for example with reference to FIG. 4 or 5. In some examples, the operation(s) at block 2030 may be performed using the PLMN determiner described with reference to FIG. 8 or 9.

At block 2035, the method 2000 may include determining whether the PLMN ID based at least in part on the time-frequency location of the second instance of the DRS matches a second PLMN ID associated with the UE, as described for example with reference to FIG. 4 or 5. Upon determining that the PLMN ID based at least in part on the time-frequency location of the second instance of the DRS matches the second PLMN ID associated with the UE, the method 2000 may continue at block 2040. Upon determining that the PLMN ID based at least in part on the time-frequency location of the second instance of the DRS does not match the second PLMN ID associated with the UE, the method 2000 may continue at block 2050. In some examples, the operation(s) at block 2035 may be performed using the random access manager described with reference to FIG. 8 or 9.

At block 2040, the method 2000 may include decoding random access configuration information included in at least one of the first instance of the DRS or the second instance of the DRS, as described for example with reference to FIG. 4 or 5. In some examples, the operation(s) at block 2035 may be performed using the random access manager described with reference to FIG. 8 or 9.

At block 2045, the method 2000 may include performing a random access procedure based at least in part on the determined PLMN ID match and the decoded random access configuration information, to connect to a base station, as described for example with reference to FIG. 4 or 5. In some examples, the operation(s) at block 2045 may be performed using the random access manager described with reference to FIG. 8 or 9.

At block 2050, the method 2000 may include refraining from performing the random access procedure based at least in part on the determined non-match, as described with reference to FIG. 4 or 5. In some examples, the operation(s) at block 2050 may be performed using the random access manager described with reference to FIG. 8 or 9.

In some examples of the method 2000, the first instance of the DRS (or the second instance of the DRS) may include an indication of a transmit power of the instance of the DRS relative to a reference power, as described for example with reference to FIG. 4. In some examples, the second instance of the DRS and the instance of the SIB may be received according to a DRS-to-SIB transmit power ratio, as also described for example with reference to FIG. 4. In some examples, a DRS-to-SIB transmit power ratio may include one of a plurality of predetermined DRS-to-SIB transmit power ratios.

In some examples of the method 2000, the second instance of the DRS may include at least one of a first demodulation reference signal included in the second instance of the DRS due to the presence of the instance of the SIB that is frequency division multiplexed with the second instance of the DRS, a second demodulation reference signal included in each instance of the DRS, or a combination thereof. The instance of the SIB (and included PLMN ID) may be decoded based at least in part on the demodulation reference signal, as described for example with reference to FIG. 4.

Figure 21:
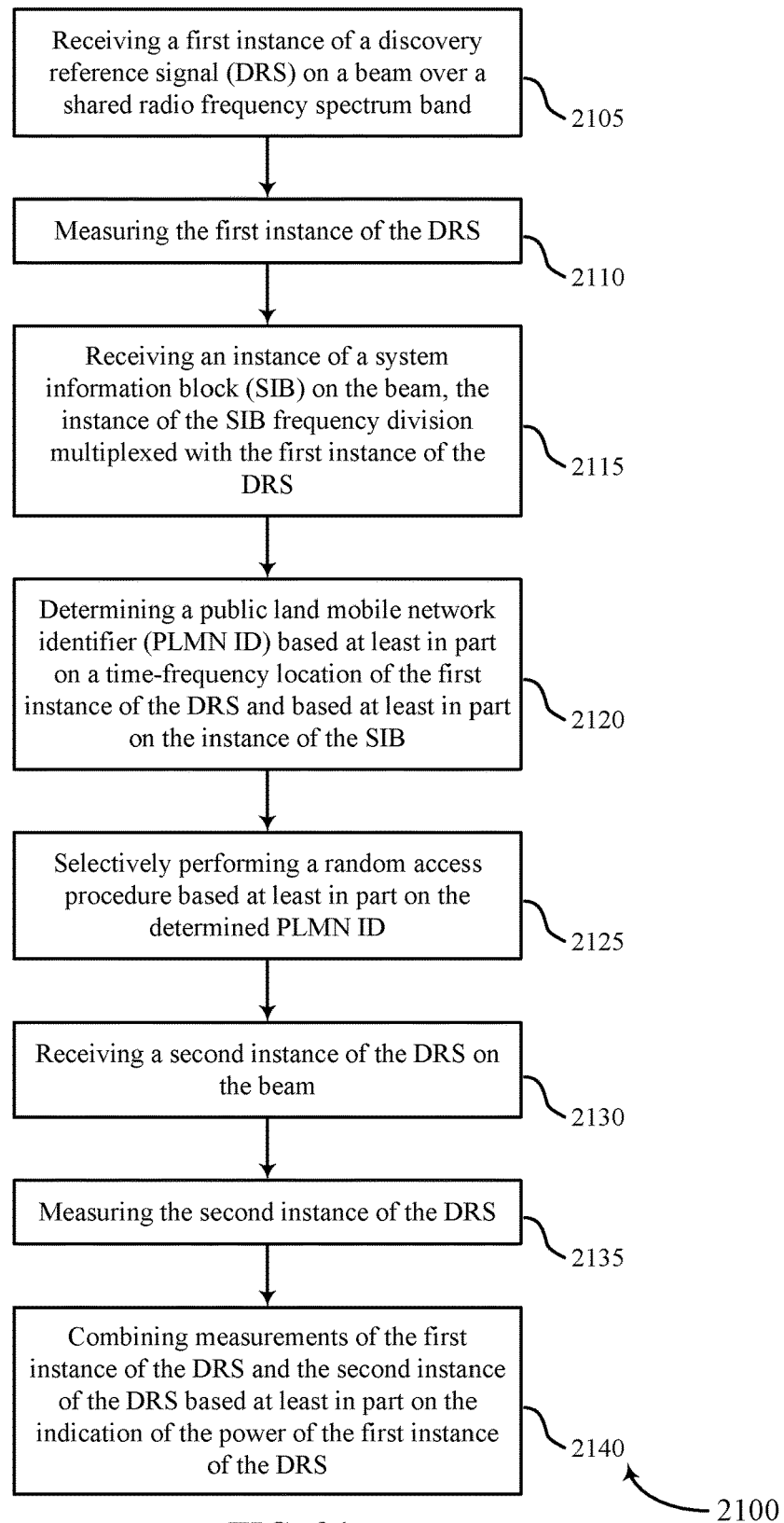

FIG. 21 is a flow chart illustrating an example of a method 2100 for wireless communication at a UE, in accordance with various aspects of the present disclosure. For clarity, the method 2100 is described below with reference to aspects of one or more of the UEs described with reference to FIG. 1 or 16, aspects of the apparatus described with reference to FIG. 8, or aspects of one or more of the wireless communication managers described with reference to FIG. 1, 8, 9, or 16. In some examples, a UE may execute one or more sets of codes to control the functional elements of the UE to perform the functions described below. Additionally or alternatively, the UE may perform one or more of the functions described below using special-purpose hardware.

At block 2105, the method 2100 may include receiving a first instance of a DRS on a beam over a shared radio frequency spectrum band, as described for example with reference to FIG. 4 or 5. In some examples, the first instance of the DRS may include an indication of a transmit power of the first instance of the DRS relative to a reference power. In some examples, the operation(s) at block 2105 may be performed using the DRS reception manager described with reference to FIG. 8 or 9.

At block 2110, the method 2100 may include measuring the first instance of the DRS, as described for example with reference to FIG. 4 or 5. In some examples, the operation(s) at block 2110 may be performed using the DRS measurement manager described with reference to FIG. 8 or 9.

At block 2115, the method 2100 may include receiving an instance of a SIB on the beam, as described for example with reference to FIG. 4 or 5. The instance of the SIB may be frequency division multiplexed with the first instance of the DRS. In some examples, the operation(s) at block 2115 may be performed using the SIB reception manager described with reference to FIG. 9.

At block 2120, the method 2100 may include determining a PLMN ID based at least in part on a time-frequency location of the first instance of the DRS and based at least in part on the instance of the SIB (e.g., the PLMN ID may be included in the instance of the SIB), as described for example with reference to FIG. 4 or 5. In some examples, the operation(s) at block 2120 may be performed using the PLMN determiner described with reference to FIG. 8 or 9.

At block 2125, the method 2100 may include selectively performing a random access procedure based at least in part on the determined PLMN ID, as described for example with reference to FIG. 4 or 5. In some examples, the operation(s) at block 2125 may be performed using the random access manager described with reference to FIG. 8 or 9.

At block 2130, the method 2100 may include receiving a second instance of the DRS on the beam, as described for example with reference to FIG. 4 or 5. In some examples, the second instance of the DRS may include an indication of a transmit power of the second instance of the DRS relative to a reference power. In some examples, the operation(s) at block 2130 may be performed using the DRS reception manager described with reference to FIG. 8 or 9.

At block 2135, the method 2100 may include measuring the second instance of the DRS, as described for example with reference to FIG. 4 or 5. In some examples, the operation(s) at block 2135 may be performed using the DRS measurement manager described with reference to FIG. 9.

At block 2140, the method 2100 may include combining measurements of the first instance of the DRS and the second instance of the DRS based at least in part on the indication of the power of the first instance of the DRS and/or the indication of the power of the second instance of the DRS, as described for example with reference to FIG. 4 or 5. In some examples, the operation(s) at block 2140 may be performed using the DRS measurement manager described with reference to FIG. 9.

Figure 22:
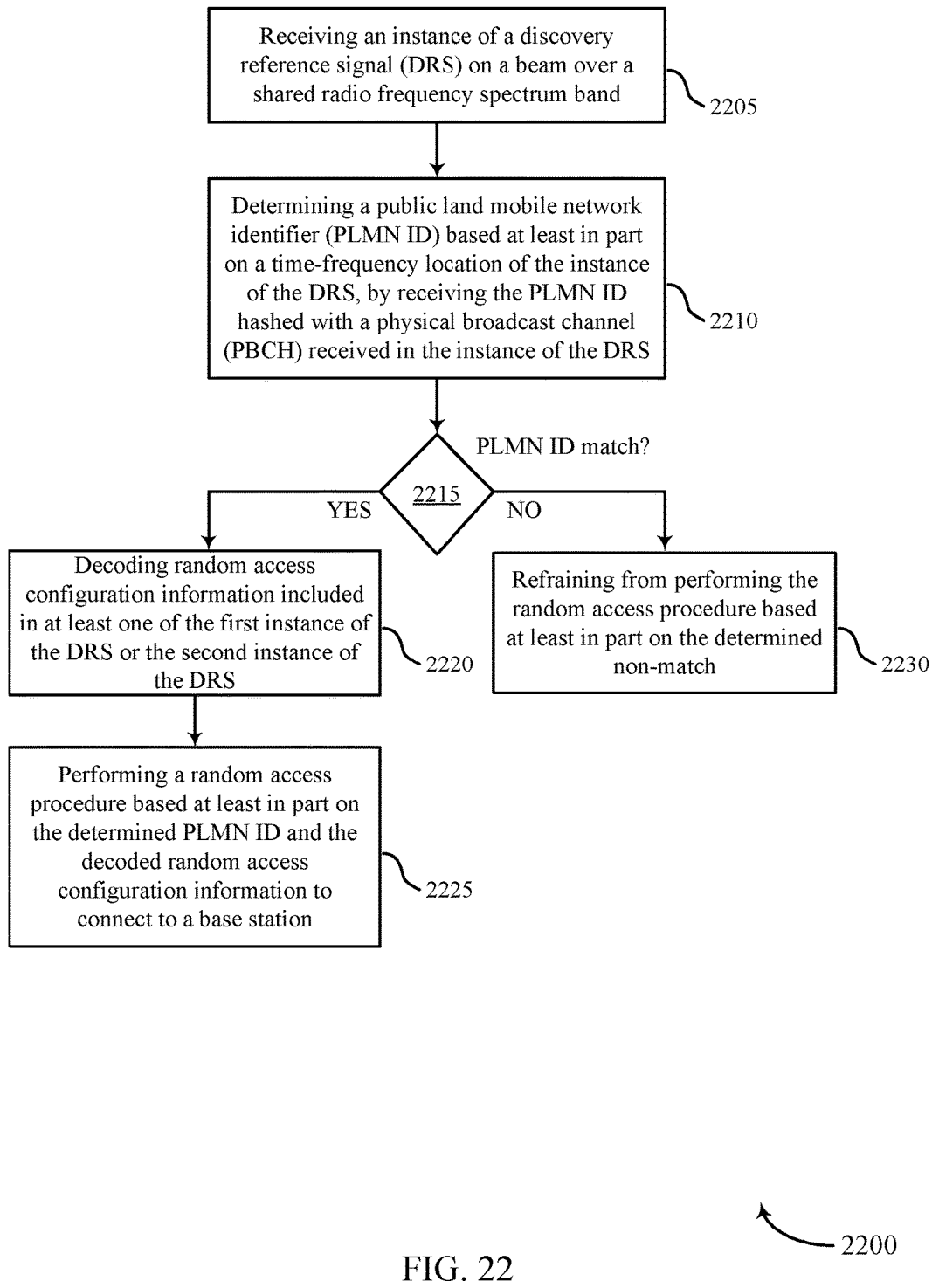

FIG. 22 is a flow chart illustrating an example of a method 2200 for wireless communication at a UE, in accordance with various aspects of the present disclosure. For clarity, the method 2200 is described below with reference to aspects of one or more of the UEs described with reference to FIG. 1 or 16, aspects of the apparatus described with reference to FIG. 8, or aspects of one or more of the wireless communication managers described with reference to FIG. 1, 8, 10, or 16. In some examples, a UE may execute one or more sets of codes to control the functional elements of the UE to perform the functions described below. Additionally or alternatively, the UE may perform one or more of the functions described below using special-purpose hardware.

At block 2205, the method 2200 may include receiving an instance of a DRS on a beam over a shared radio frequency spectrum band, as described for example with reference to FIG. 6. In some examples, the operation(s) at block 2205 may be performed using the DRS reception manager described with reference to FIG. 8 or 10.

At block 2210, the method 2200 may include determining a PLMN ID based at least in part on a time-frequency location of the instance of the DRS, as described for example with reference to FIG. 6. In some examples, determining the PLMN ID may include receiving the PLMN ID hashed with a PBCH received in the instance of the DRS. In some examples, the operation(s) at block 2210 may be performed using the PLMN determiner described with reference to FIG. 8, or the PLMN unhasher described with reference to FIG. 10.

At block 2215, the method 2000 may include determining whether the PLMN ID based at least in part on the time-frequency location of the second instance of the DRS matches a second PLMN ID associated with the UE, as described for example with reference to FIG. 6. Upon determining that the PLMN ID based at least in part on the time-frequency location of the second instance of the DRS matches the second PLMN ID associated with the UE, the method 2200 may continue at block 2220. Upon determining that the PLMN ID based at least in part on the time-frequency location of the second instance of the DRS does not match the second PLMN ID associated with the UE, the method 2200 may continue at block 2230. In some examples, the operation(s) at block 2215 may be performed using the random access manager described with reference to FIG. 8 or 10.

At block 2220, the method 2200 may optionally include decoding random access configuration information included in the instance of the DRS or another instance of the DRS, as described for example with reference to FIG. 6. In some examples, the operation(s) at block 2220 may be performed using the random access manager described with reference to FIG. 8 or 10.

At block 2225, the method 2200 may include performing a random access procedure based at least in part on the determined PLMN ID match and the decoded random access configuration information, to connect to a base station, as described for example with reference to FIG. 6. In some examples, the operation(s) at block 2225 may be performed using the random access manager described with reference to FIG. 8 or 10.

At block 2230, the method 2200 may include refraining from performing the random access procedure based at least in part on the determined non-match, as described with reference to FIG. 6. In some examples, the operation(s) at block 2230 may be performed using the random access manager described with reference to FIG. 8 or 10.

Figure 23:
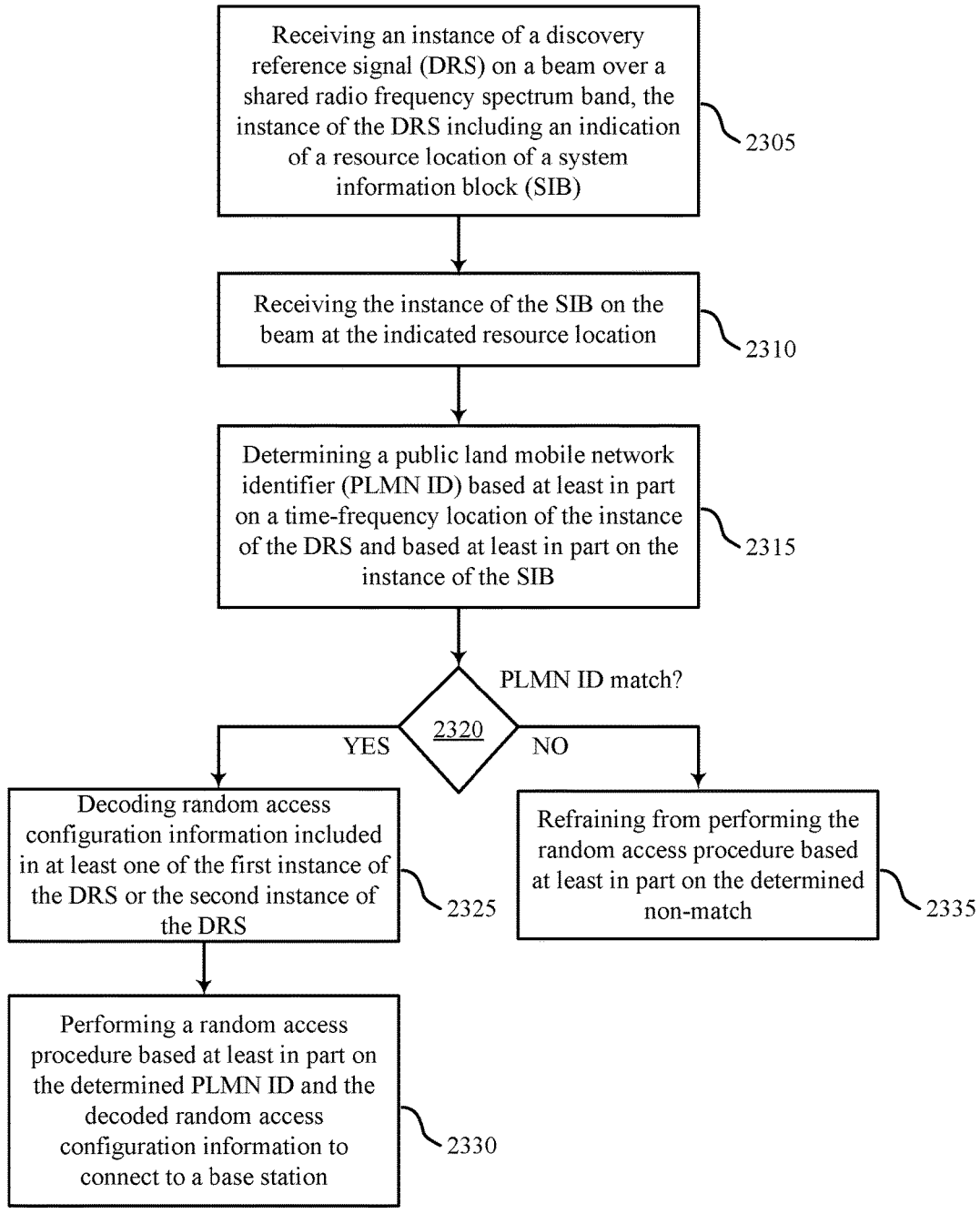

FIG. 23 is a flow chart illustrating an example of a method 2300 for wireless communication at a UE, in accordance with various aspects of the present disclosure. For clarity, the method 2300 is described below with reference to aspects of one or more of the UEs described with reference to FIG. 1 or 16, aspects of the apparatus described with reference to FIG. 8, or aspects of one or more of the wireless communication managers described with reference to FIG. 1, 8, 11, or 16. In some examples, a UE may execute one or more sets of codes to control the functional elements of the UE to perform the functions described below. Additionally or alternatively, the UE may perform one or more of the functions described below using special-purpose hardware.

At block 2305, the method 2300 may include receiving an instance of a DRS on a beam over a shared radio frequency spectrum band, as described for example with reference to FIG. 7. The instance of the DRS may include an indication of a resource location of a SIB transmitted on the beam. In some examples, the resource location may include a time window in which a transmission of the instance of the SIB commences. In some examples, the indication of the resource location of the instance of the SIB may be included in at least one of a PBCH received in the instance of the DRS, Layer 1 signaling associated with the instance of the DRS, or a combination thereof. In some examples, the operation(s) at block 2305 may be performed using the DRS reception manager described with reference to FIG. 8 or 11.

At block 2310, the method 2300 may include receiving the instance of the SIB on the beam at the indicated resource location, as described for example with reference to FIG. 7. In some examples, the instance of the DRS may be part of a multi-beam DRS transmission, and the instance of the SIB may be received as a single beam transmission. In some examples, the operation(s) at block 2310 may be performed using the PLMN determiner described with reference to FIG. 8, or the SIB reception manager described with reference to FIG. 11.

At block 2315, the method 2300 may include determining a PLMN ID based at least in part on a time-frequency location of the instance of the DRS (e.g., based at least in part on the indication of the resource location of the instance of the SIB included in the instance of the DRS) and based at least in part on the instance of the SIB (e.g., the PLMN ID may be included in the instance of the SIB), as described for example with reference to FIG. 7. In some examples, the operation(s) at block 2315 may be performed using the PLMN determiner described with reference to FIG. 8 or 11.

At block 2320, the method 2000 may include determining whether the PLMN ID based at least in part on the time-frequency location of the second instance of the DRS matches a second PLMN ID associated with the UE, as described for example with reference to FIG. 7. Upon determining that the PLMN ID based at least in part on the time-frequency location of the second instance of the DRS matches the second PLMN ID associated with the UE, the method 2300 may continue at block 2325. Upon determining that the PLMN ID based at least in part on the time-frequency location of the second instance of the DRS does not match the second PLMN ID associated with the UE, the method 2300 may continue at block 2335. In some examples, the operation(s) at block 2320 may be performed using the random access manager described with reference to FIG. 8 or 11.

At block 2325, the method 2300 may optionally include decoding random access configuration information included in the instance of the DRS or another instance of the DRS, as described for example with reference to FIG. 7. In some examples, the operation(s) at block 2325 may be performed using the random access manager described with reference to FIG. 8 or 11.

At block 2330, the method 2300 may include performing a random access procedure based at least in part on the determined PLMN ID match and the decoded random access configuration information, to connect to a base station, as described for example with reference to FIG. 7. In some examples, the operation(s) at block 2330 may be performed using the random access manager described with reference to FIG. 8 or 11.

At block 2335, the method 2300 may include refraining from performing the random access procedure based at least in part on the determined non-match, as described with reference to FIG. 7. In some examples, the operation(s) at block 2335 may be performed using the random access manager described with reference to FIG. 8 or 11.

Figure 24:
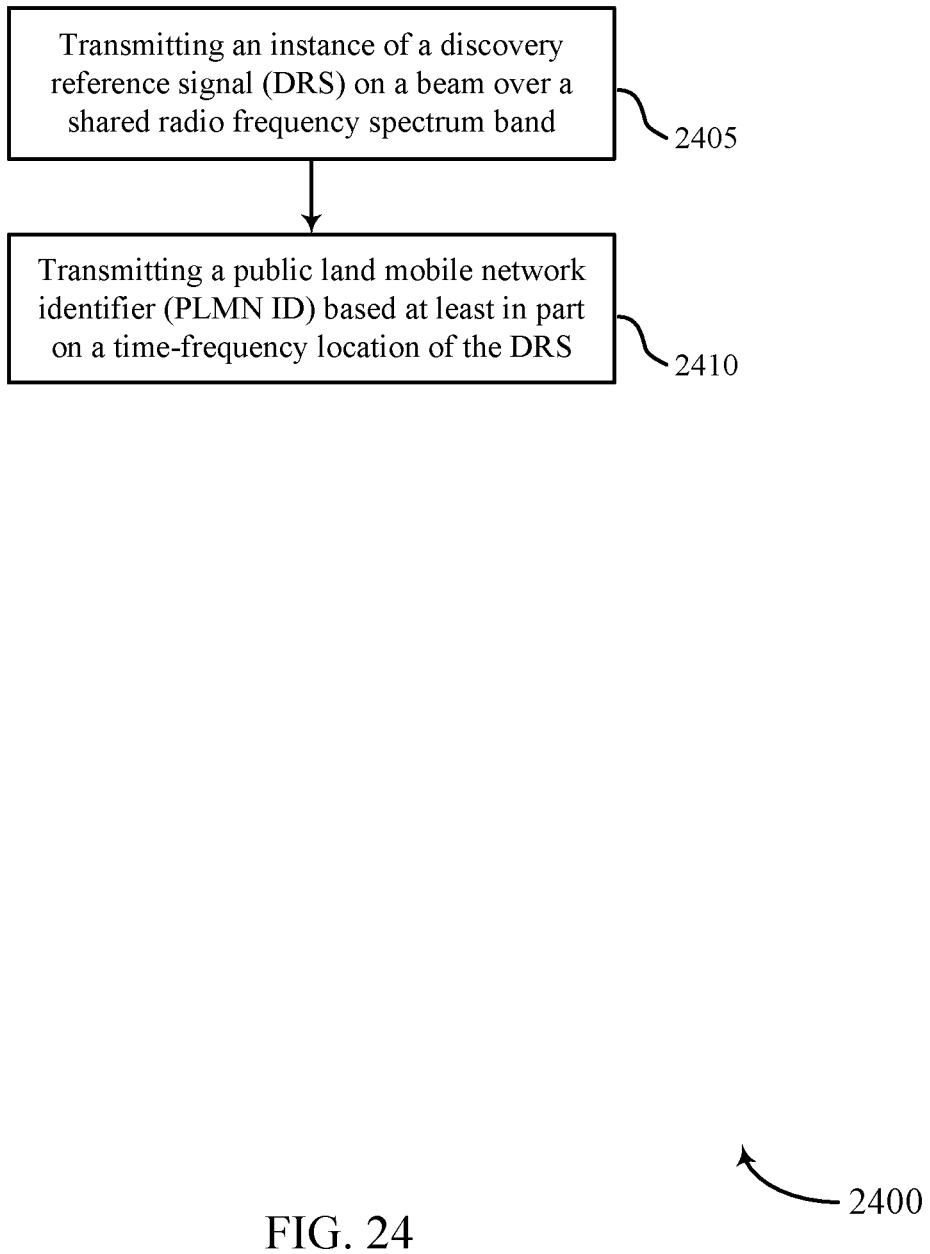
FIGS. 24-28 are flow charts illustrating examples of methods for wireless communication at a base station, in accordance with various aspects of the present disclosure.

FIG. 24 is a flow chart illustrating an example of a method 2400 for wireless communication at a base station, in accordance with various aspects of the present disclosure. For clarity, the method 2400 is described below with reference to aspects of one or more of the base stations described with reference to FIG. 1 or 17, aspects of the apparatus described with reference to FIG. 12, or aspects of one or more of the wireless communication managers described with reference to FIG. 1, 12, 13, 14, 15, or 17. In some examples, a base station may execute one or more sets of codes to control the functional elements of the base station to perform the functions described below. Additionally or alternatively, the base station may perform one or more of the functions described below using special-purpose hardware.

At block 2405, the method 2400 may include transmitting an instance of a DRS on a beam over a shared radio frequency spectrum band, as described for example with reference to FIG. 4, 5, 6, or 7. In some examples, the operation(s) at block 2405 may be performed using the DRS transmission manager described with reference to FIG. 12, 13, 14, or 15.

At block 2410, the method 2400 may include transmitting a PLMN ID based at least in part on a time-frequency location of the instance of the DRS, as described for example with reference to FIG. 4, 5, 6, or 7. In some examples, the operation(s) at block 2410 may be performed using the PLMN transmission manager described with reference to FIG. 12, 13, 14, or 15.

Figure 25:
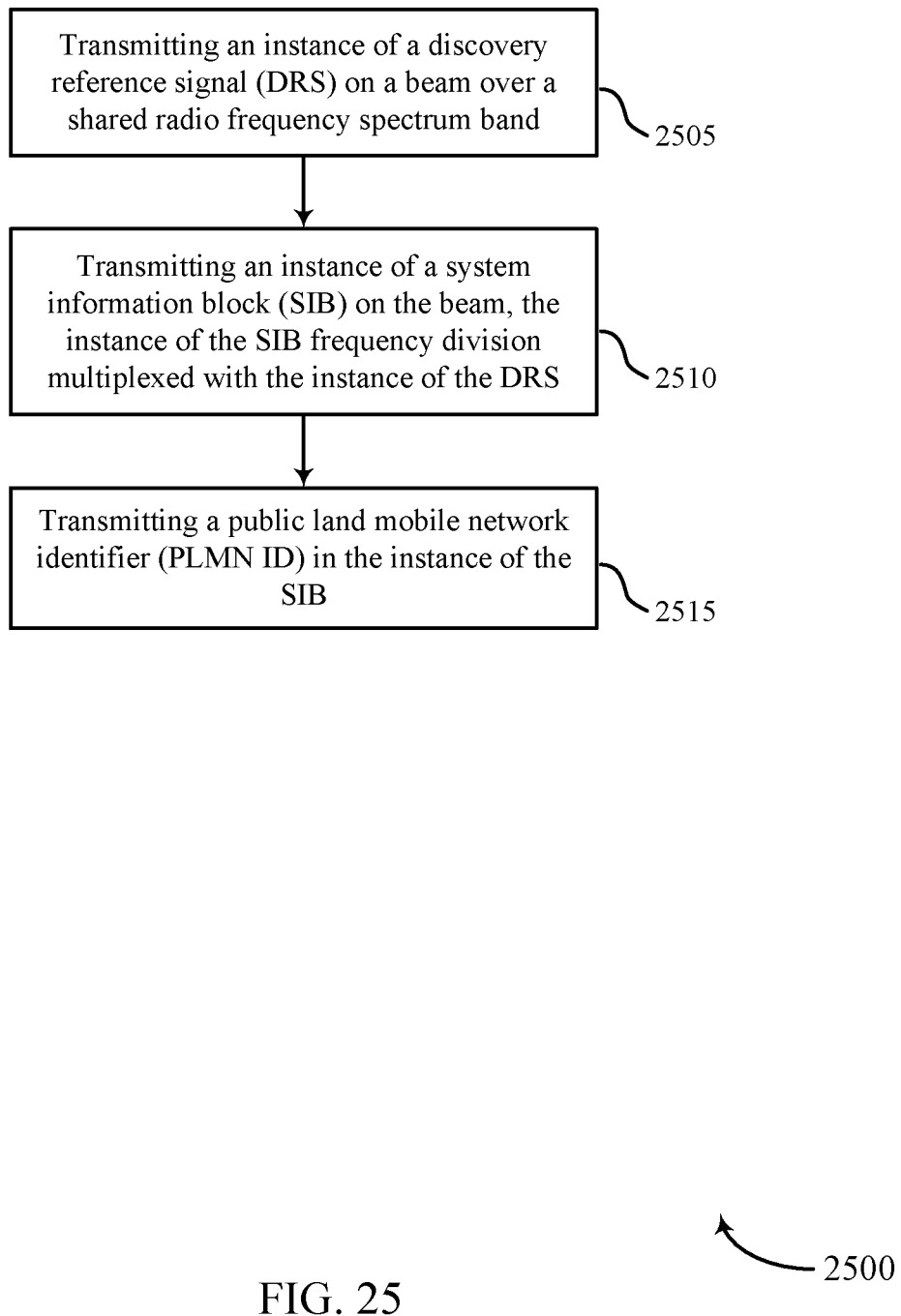

FIG. 25 is a flow chart illustrating an example of a method 2500 for wireless communication at a base station, in accordance with various aspects of the present disclosure. For clarity, the method 2500 is described below with reference to aspects of one or more of the base stations described with reference to FIG. 1 or 17, aspects of the apparatus described with reference to FIG. 12, or aspects of one or more of the wireless communication managers described with reference to FIG. 1, 12, 13, or 17. In some examples, a base station may execute one or more sets of codes to control the functional elements of the base station to perform the functions described below. Additionally or alternatively, the base station may perform one or more of the functions described below using special-purpose hardware.

At block 2505, the method 2500 may include transmitting an instance of a DRS on a beam over a shared radio frequency spectrum band, as described for example with reference to FIG. 4 or 5. In some examples, the operation(s) at block 2505 may be performed using the DRS transmission manager described with reference to FIG. 12 or 13.

At block 2510, the method 2500 may include transmitting an instance of a SIB on the beam. The instance of the SIB may be frequency division multiplexed with the instance of the DRS, as described for example with reference to FIG. 4 or 5. In some examples, the operation(s) at block 2510 may be performed using the SIB transmission manager described with reference to FIG. 13.

At block 2515, the method 2500 may include transmitting a PLMN ID based at least in part on a time-frequency location of the instance of the DRS (e.g., in the instance of the SIB), as described for example with reference to FIG. 4 or 5. In some examples, the operation(s) at block 2515 may be performed using the PLMN transmission manager described with reference to FIG. 12 or 13.

In some examples of the method 2500, the instance of the DRS may be a second instance of the DRS, and the method 2500 may further include transmitting a first instance of the DRS. Each of the first instance of the DRS and the second instance of the DRS may include a set of one or more synchronization signals for synchronizing with the base station.

In some examples, the method 2500 may include selecting a transmit power for the instance of the DRS, and transmitting, in the instance of the DRS, an indication of the transmit power of the instance of the DRS relative to a reference power, as described for example with reference to FIG. 4. In some examples, the instance of the DRS and the instance of the SIB may be transmitted according to a DRS-to-SIB transmit power ratio, as also described for example with reference to FIG. 4. In some examples, the method 2500 may include selecting the DRS-to-SIB transmit power ratio from a plurality of predetermined DRS-to-SIB transmit power ratios.

In some examples, the method 2500 may include transmitting, in the instance of the DRS, at least one of a first demodulation reference signal included in the instance of the DRS due to the presence of the instance of the SIB that is frequency division multiplexed with the instance of the DRS, a second demodulation reference signal included in each instance of the DRS, or a combination thereof. The transmitted reference signal may be used by a UE to decode the instance of the SIB, as described for example with reference to FIG. 4.

In some examples, the method 2500 may include selecting a LBT priority class for the instance of the DRS based at least in part on the transmission of the instance of the SIB that is frequency division multiplexed with the instance of the DRS.

Figure 26:
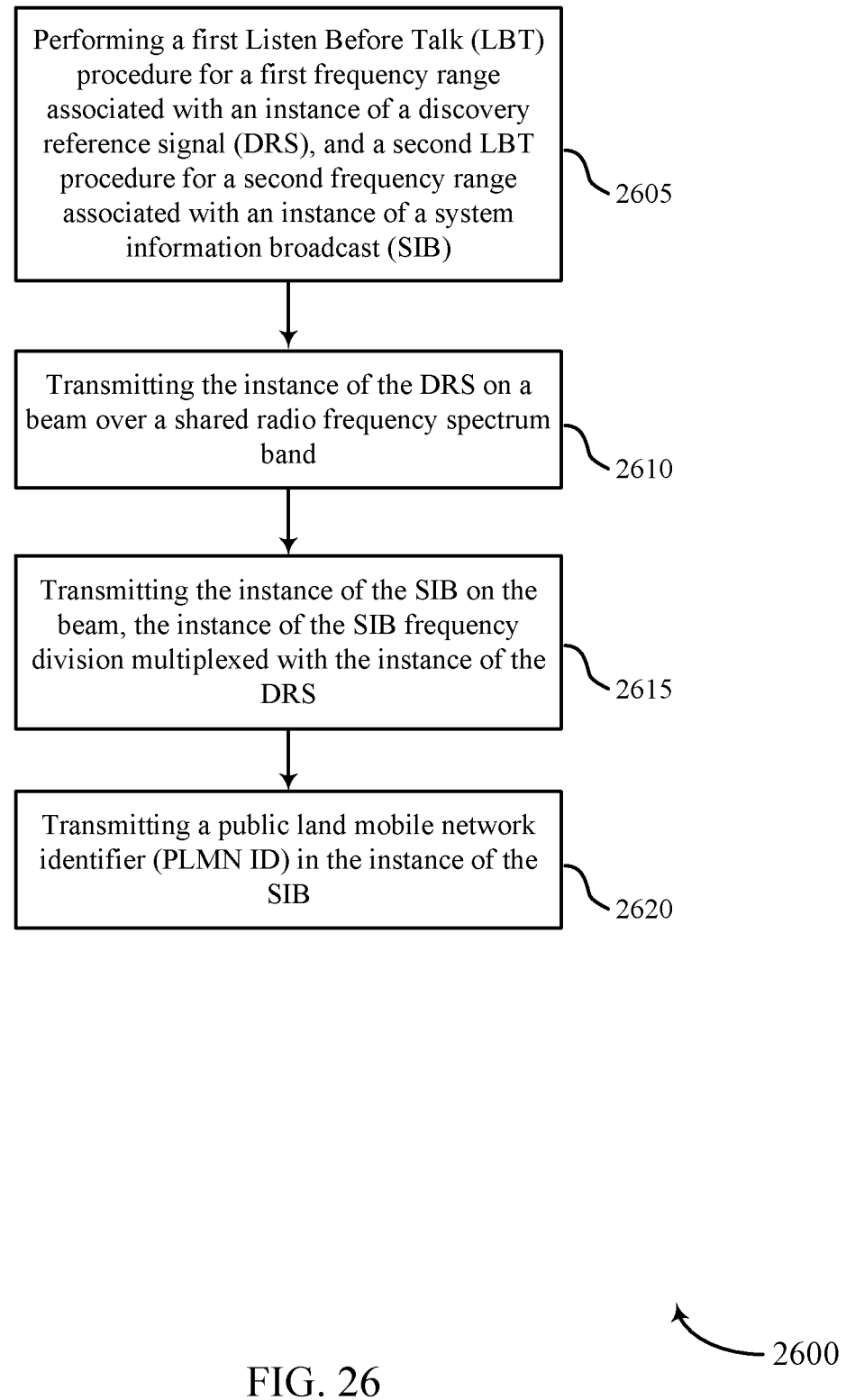

FIG. 26 is a flow chart illustrating an example of a method 2600 for wireless communication at a base station, in accordance with various aspects of the present disclosure. For clarity, the method 2600 is described below with reference to aspects of one or more of the base stations described with reference to FIG. 1 or 17, aspects of the apparatus described with reference to FIG. 12, or aspects of one or more of the wireless communication managers described with reference to FIG. 1, 12, 13, or 17. In some examples, a base station may execute one or more sets of codes to control the functional elements of the base station to perform the functions described below. Additionally or alternatively, the base station may perform one or more of the functions described below using special-purpose hardware.

At block 2605, the method 2600 may include performing a first LBT procedure for a first frequency range associated with an instance of a DRS, and a second LBT procedure for a second frequency range associated with an instance of a SIB, as described for example with reference to FIG. 4 or 5. In some examples, the operation(s) at block 2605 may be performed using the LBT manager described with reference to FIG. 13.

At block 2610, the method 2600 may include transmitting the instance of the DRS on a beam over a shared radio frequency spectrum band, as described for example with reference to FIG. 4 or 5. The instance of the DRS may be transmitted based at least in part on the first LBT procedure. In some examples, the operation(s) at block 2610 may be performed using the DRS transmission manager described with reference to FIG. 12 or 13.

At block 2615, the method 2600 may include transmitting the instance of the SIB on the beam. The instance of the SIB may be frequency division multiplexed with the instance of the DRS, as described for example with reference to FIG. 4 or 5. The instance of the SIB may be transmitted based at least in part on the second LBT procedure. In some examples, the operation(s) at block 2615 may be performed using the SIB transmission manager described with reference to FIG. 12 or 13.

At block 2620, the method 2600 may include transmitting a PLMN ID based at least in part on a time-frequency location of the instance of the DRS (e.g., in the instance of the SIB), as described for example with reference to FIG. 4 or 5. In some examples, the operation(s) at block 2620 may be performed using the PLMN transmission manager described with reference to FIG. 12 or 13.

In some examples of the method 2600, the instance of the DRS may be a second instance of the DRS, and the method 2600 may further include transmitting a first instance of the DRS. Each of the first instance of the DRS and the second instance of the DRS may include a set of one or more synchronization signals for synchronizing with the base station.

In some examples, the method 2600 may include selecting a transmit power for the instance of the DRS, and transmitting, in the instance of the DRS, an indication of the transmit power of the instance of the DRS relative to a reference power, as described for example with reference to FIG. 4. In some examples, the instance of the DRS and the instance of the SIB may be transmitted according to a DRS-to-SIB transmit power ratio, as also described for example with reference to FIG. 4. In some examples, the method 2600 may include selecting the DRS-to-SIB transmit power ratio from a plurality of predetermined DRS-to-SIB transmit power ratios.

In some examples, the method 2600 may include transmitting, in the instance of the DRS, at least one of a first demodulation reference signal included in the instance of the DRS due to the presence of the instance of the SIB that is frequency division multiplexed with the instance of the DRS, a second demodulation reference signal included in each instance of the DRS, or a combination thereof. The transmitted reference signal may be used by a UE to decode the instance of the SIB, as described for example with reference to FIG. 4.

In some examples, the method 2600 may include selecting a LBT priority class for the instance of the DRS based at least in part on the transmission of the instance of the SIB that is frequency division multiplexed with the instance of the DRS.

Figure 27:
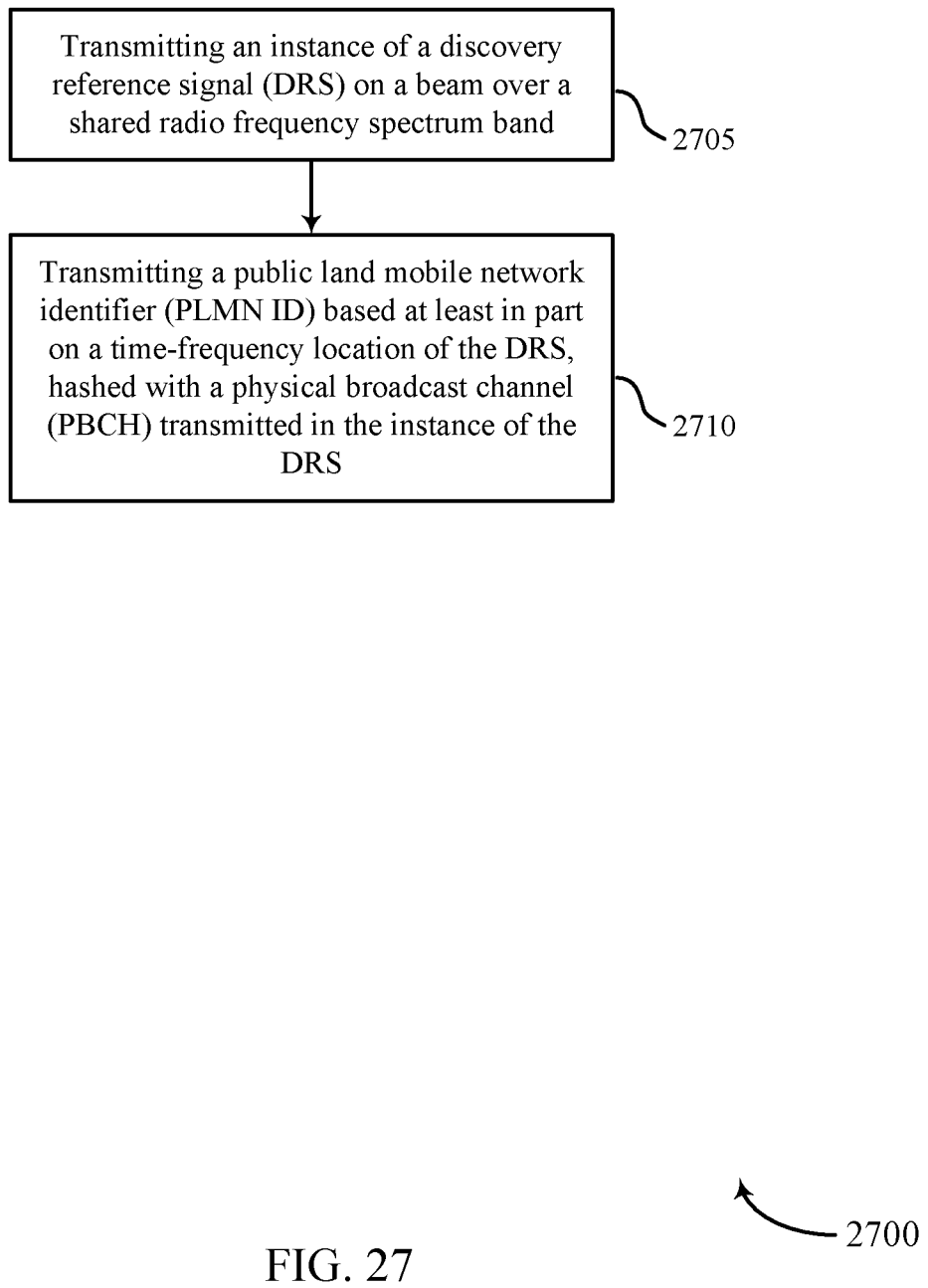

FIG. 27 is a flow chart illustrating an example of a method 2700 for wireless communication at a base station, in accordance with various aspects of the present disclosure. For clarity, the method 2700 is described below with reference to aspects of one or more of the base stations described with reference to FIG. 1 or 17, aspects of the apparatus described with reference to FIG. 12, or aspects of one or more of the wireless communication managers described with reference to FIG. 1, 12, 14, or 17. In some examples, a base station may execute one or more sets of codes to control the functional elements of the base station to perform the functions described below. Additionally or alternatively, the base station may perform one or more of the functions described below using special-purpose hardware.

At block 2705, the method 2700 may include transmitting an instance of a DRS on a beam over a shared radio frequency spectrum band, as described for example with reference to FIG. 6. In some examples, the operation(s) at block 2705 may be performed using the DRS transmission manager described with reference to FIG. 12 or 14.

At block 2710, the method 2700 may include transmitting a PLMN ID based at least in part on a time-frequency location of the instance of the DRS, as described for example with reference to FIG. 6. In some examples, transmitting the PLMN ID may include transmitting the PLMN ID hashed with a PBCH transmitted in the instance of the DRS. In some examples, the operation(s) at block 2710 may be performed using the PLMN transmission manager described with reference to FIG. 12, or the PLMN hasher described with reference to FIG. 14.

Figure 28:
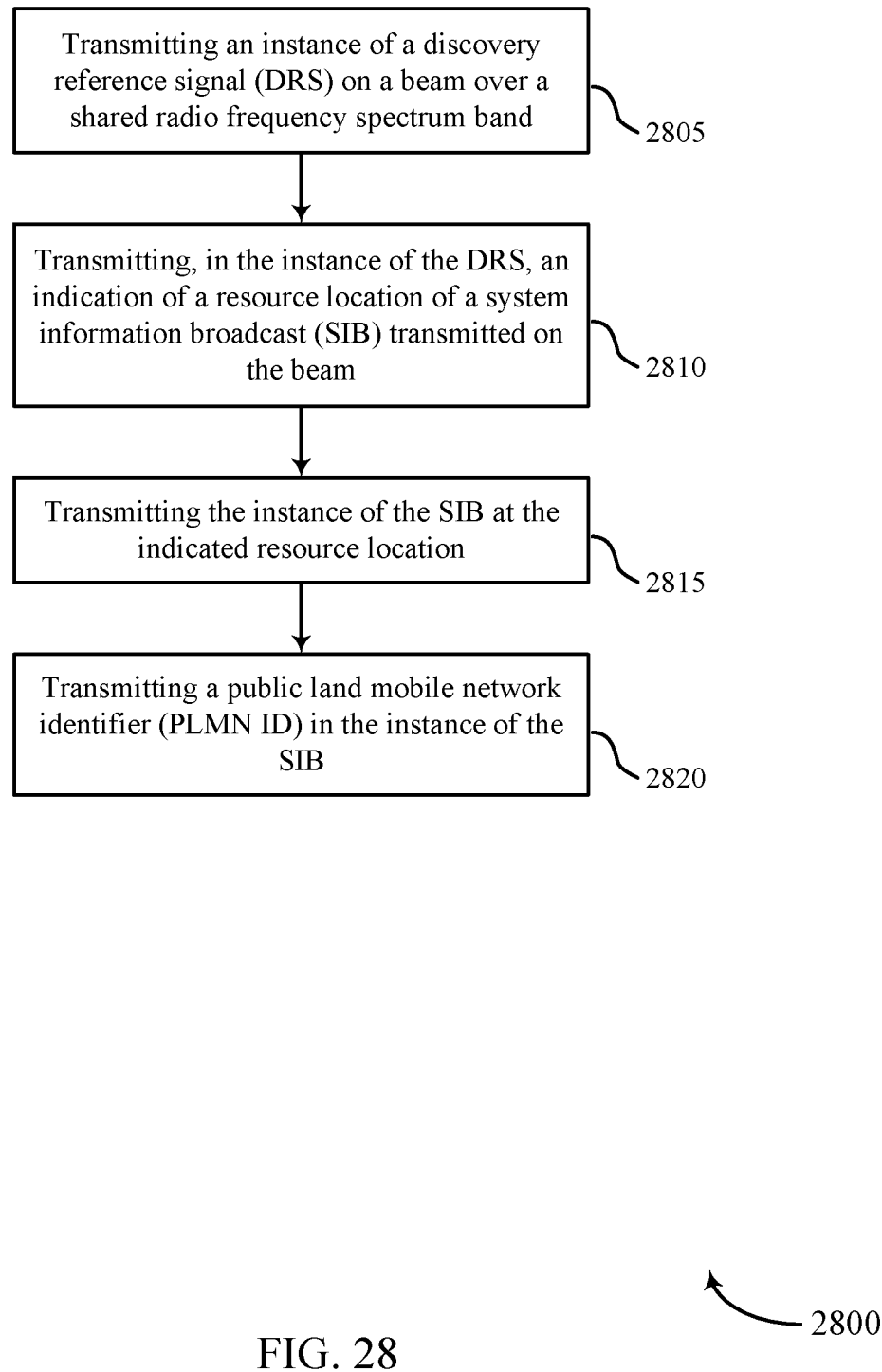

FIG. 28 is a flow chart illustrating an example of a method 2800 for wireless communication at a base station, in accordance with various aspects of the present disclosure. For clarity, the method 2800 is described below with reference to aspects of one or more of the base stations described with reference to FIG. 1 or 17, aspects of the apparatus described with reference to FIG. 12, or aspects of one or more of the wireless communication managers described with reference to FIG. 1, 12, 15, or 17. In some examples, a base station may execute one or more sets of codes to control the functional elements of the base station to perform the functions described below. Additionally or alternatively, the base station may perform one or more of the functions described below using special-purpose hardware.

At block 2805, the method 2800 may include transmitting an instance of a DRS on a beam over a shared radio frequency spectrum band, as described for example with reference to FIG. 7. In some examples, the instance of the DRS may be part of a multi-beam DRS transmission. In some examples, the operation(s) at block 2805 may be performed using the DRS transmission manager described with reference to FIG. 12 or 15.

At block 2810, the method 2800 may include transmitting, in the instance of the DRS, an indication of a resource location of a SIB transmitted on the beam, as described for example with reference to FIG. 7. In some examples, the indication of the resource location may include an indication of a time window in which a transmission of the instance of the SIB commences. In some examples, the resource location of the instance of the SIB may be transmitted in at least one of a PBCH transmitted in the instance of the DRS, Layer 1 signaling associated with the instance of the DRS, or a combination thereof. In some examples, the operation(s) at block 2810 may be performed using the SIB location indicator described with reference to FIG. 15.

At block 2815, the method 2800 may include transmitting the instance of the SIB at the indicated resource location, as described for example with reference to FIG. 7. In some examples, the instance of the SIB may be transmitted subject to completion of a LBT procedure. In some examples, the instance of the SIB may be transmitted frequency division multiplexed with a directional DRS transmission. In some examples, the operation(s) at block 2815 may be performed using the SIB transmission manager described with reference to FIG. 15.

At block 2820, the method 2800 may include transmitting a PLMN ID based at least in part on a time-frequency location of the instance of the DRS (e.g., in the instance of the SIB transmitted at the resource location indicated in the DRS), as described with reference to FIG. 7. In some examples, the operation(s) at block 2820 may be performed using the PLMN transmission manager described with reference to FIG. 12 or 15.

The methods 1800, 1900, 2000, 2100, 2200, 2300, 2400, 2500, 2600, 2700, and 2800 described with reference to FIGS. 18, 19, 20, 21, 22, 23, 24, 25, 26, 27, and 28 may provide for wireless communication. It should be noted that the methods 1800, 1900, 2000, 2100, 2200, 2300, 2400, 2500, 2600, 2700, and 2800 are example implementations of some of the techniques described in the present disclosure, and the operations of methods 1800, 1900, 2000, 2100, 2200, 2300, 2400, 2500, 2600, 2700, and 2800 may be rearranged, combined with other operations of the same or different method, or otherwise modified, such that other implementations are possible. Operations may also be added to the methods 1800, 1900, 2000, 2100, 2200, 2300, 2400, 2500, 2600, 2700, and 2800.

Techniques described herein may be used for various wireless communication systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A may be referred to as CDMA2000 1x, 1x, etc. IS-856 (TIA-856) may be referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP LTE and LTE-A are new releases of UMTS that use E-UTRA. UTRA, E-UTRA, UMTS, LTE, LTE-A, and GSM are described in documents from an organization named 3GPP. CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over an unlicensed or shared bandwidth. The description above, however, describes an LTE/LTE-A system for purposes of example, and LTE terminology is used in much of the description above, although the techniques are applicable beyond LTE/LTE-A applications.

The detailed description set forth above in connection with the appended drawings describes examples and does not represent all of the examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Components implementing functions may also be physically located at various positions, including being distributed such that portions of functions are implemented at different physical locations. As used herein, including in the claims, the term "or," when used in a list of two or more items, means that any one of the listed items can be employed by itself, or any combination of two or more of the listed items can be employed. For example, if a composition is described as containing components A, B, or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel techniques disclosed herein.

What is claimed is:

1. A method for wireless communication at a user equipment (UE), comprising:
   receiving an instance of a discovery reference signal (DRS) on a beam over a shared radio frequency spectrum band;
   receiving an instance of a system information block (SIB) on the beam, the instance of the SIB frequency division multiplexed with the instance of the DRS, wherein the instance of the DRS and the instance of the SIB are received according to a DRS-to-SIB transmit power ratio;
   determining a public land mobile network identifier (PLMN ID) based at least in part on a time-frequency location of the instance of the DRS, wherein the PLMN ID is determined based at least in part on the instance of the SIB; and
   selectively performing a random access procedure based at least in part on the determined PLMN ID.

2. The method of claim 1, wherein the instance of the DRS is a second instance of the DRS, the method further comprising:
   receiving a first instance of the DRS on the beam;
   synchronizing with a base station based at least in part on a set of one or more synchronization signals included in the first instance of the DRS; and
   decoding the instance of the SIB based at least in part on the synchronizing with the base station.

3. The method of claim 2, further comprising:
   determining the PLMN ID based at least in part on the time-frequency location of the instance of the DRS matches a second PLMN ID associated with the UE;
   decoding random access configuration information included in at least one of the first instance of the DRS or the second instance of the DRS; and
   performing the random access procedure based at least in part on the determined PLMN ID match and the decoded random access configuration information, to connect to the base station.

4. The method of claim 2, further comprising:
   determining the PLMN ID based at least in part on the time-frequency location of the instance of the DRS does not match a second PLMN ID associated with the UE; and
   refraining from performing the random access procedure based at least in part on the determined non-match.

5. The method of claim 1, wherein the DRS-to-SIB transmit power ratio comprises one of a plurality of predetermined DRS-to-SIB transmit power ratios.

6. The method of claim 1, wherein the instance of the DRS comprises an indication of a transmit power of the instance of the DRS relative to a reference power.

7. The method of claim 6, wherein the instance of the DRS is a first instance of the DRS, the method further comprising:
   receiving a second instance of the DRS;
   measuring the first instance of the DRS and the second instance of the DRS; and
   combining measurements of the first instance of the DRS and the second instance of the DRS based at least in part on the indication of the power of the first instance of the DRS.

8. The method of claim 1, wherein the instance of the DRS comprises at least one of: a first demodulation reference signal included in the instance of the DRS due to the presence of the instance of the SIB that is frequency division multiplexed with the instance of the DRS, a second demodulation reference signal included in each instance of the DRS, or a combination thereof.

9. A method for wireless communication at a user equipment (UE), comprising:
   receiving an instance of a discovery reference signal (DRS) on a beam over a shared radio frequency spectrum band;
   determining a public land mobile network identifier (PLMN ID) based at least in part on a time-frequency location of the instance of the DRS, wherein the PLMN ID is hashed with a physical broadcast channel (PBCH) received in the instance of the DRS; and selectively performing a random access procedure based at least in part on the determined PLMN ID.

10. The method of claim 9, further comprising:
determining the PLMN ID based at least in part on the time-frequency location of the instance of the DRS matches a second PLMN ID associated with the UE;
decoding random access configuration information included in at least one of the first instance of the DRS or another instance of the DRS; and
performing the random access procedure based at least in part on the determined match and the decoded random access configuration information, to connect to a base station.

11. The method of claim 9, further comprising:
determining the PLMN ID based at least in part on the time-frequency location of the instance of the DRS does not match a second PLMN ID associated with the UE; and
refraining from performing the random access procedure based at least in part on the determined non-match.

12. A method for wireless communication at a user equipment (UE), comprising:
receiving an instance of a discovery reference signal (DRS) on a beam over a shared radio frequency spectrum band, wherein the instance of the DRS comprises an indication of a resource location of a SIB transmitted on the beam;
receiving the instance of the SIB on the beam at the indicated resource location; and
determining a public land mobile network identifier (PLMN ID) based at least in part on a time-frequency location of the instance of the DRS, wherein the PLMN ID is determined based at least in part on the instance of the SIB.

13. The method of claim 12, wherein the resource location comprises a time window in which a transmission of the instance of the SIB commences.

14. The method of claim 12, wherein the instance of the DRS is part of a multi-beam DRS transmission, and the instance of the SIB is received as a single beam transmission.

15. The method of claim 12, wherein the indication of the resource location of the instance of the SIB is included in at least one of: a physical broadcast channel (PBCH) received in the instance of the DRS, Layer 1 signaling associated with the instance of the DRS, or a combination thereof.

16. The method of claim 12, further comprising:
determining the PLMN ID based at least in part on the time-frequency location of the instance of the DRS matches a second PLMN ID associated with the UE;
decoding random access configuration information included in at least one of the first instance of the DRS or another instance of the DRS; and
performing the random access procedure based at least in part on the determined match and the decoded random access configuration information, to connect to a base station.

17. The method of claim 12, further comprising:
determining the PLMN ID based at least in part on the time-frequency location of the instance of the DRS does not match a second PLMN ID associated with the UE; and
refraining from performing the random access procedure based at least in part on the determined non-match.

18. An apparatus for wireless communication at a user equipment (UE), comprising:
a processor;
memory in electronic communication with the processor; and
instructions stored in the memory, wherein the instructions are executable by the processor to:
receive an instance of a discovery reference signal (DRS) on a beam over a shared radio frequency spectrum band;
receive an instance of a system information block (SIB) on the beam, the instance of the SIB frequency division multiplexed with the instance of the DRS, wherein the instance of the DRS and the instance of the SIB are received according to a DRS-to-SIB transmit power ratio;
determine a public land mobile network identifier (PLMN ID) based at least in part on a time-frequency location of the instance of the DRS, wherein the PLMN ID is determined based at least in part on the instance of the SIB; and
selectively perform a random access procedure based at least in part on the determined PLMN ID.

19. The apparatus of claim 18, wherein the instance of the DRS is a second instance of the DRS, and the instructions are executable by the processor to:
receive a first instance of the DRS on the beam;
synchronize with a base station based at least in part on a set of one or more synchronization signals included in the first instance of the DRS; and
decode the instance of the SIB based at least in part on the synchronizing with the base station.

20. The apparatus of claim 18, wherein the instance of the DRS comprises an indication of a transmit power of the instance of the DRS relative to a reference power.

21. The apparatus of claim 18, wherein the instance of the DRS comprises at least one of: a first demodulation reference signal included in the instance of the DRS due to the presence of the instance of the SIB that is frequency division multiplexed with the instance of the DRS, a second demodulation reference signal included in each instance of the DRS, or a combination thereof.

22. An apparatus for wireless communication at a user equipment (UE), comprising:
a processor;
memory in electronic communication with the processor; and
instructions stored in the memory, wherein the instructions are executable by the processor to:
receive an instance of a discovery reference signal (DRS) on a beam over a shared radio frequency spectrum band;
determine a public land mobile network identifier (PLMN ID) based at least in part on a time-frequency location of the instance of the DRS, wherein receive the PLMN ID is hashed with a physical broadcast channel (PBCH) received in the instance of the DRS; and
selectively perform a random access procedure based at least in part on the determined PLMN ID.

23. An apparatus for wireless communication at a user equipment (UE), comprising:
a processor;
memory in electronic communication with the processor; and
instructions stored in the memory, wherein the instructions are executable by the processor to:

receive an instance of a discovery reference signal (DRS) on a beam over a shared radio frequency spectrum band, wherein the instance of the DRS comprises an indication of a resource location of a SIB transmitted on the beam;

receive the instance of the SIB on the beam at the indicated resource location;

determine a public land mobile network identifier (PLMN ID) based at least in part on a time-frequency location of the instance of the DRS, wherein the PLMN ID is determined based at least in part on the instance of the SIB.

24. The apparatus of claim 23, wherein the resource location comprises a time window in which a transmission of the instance of the SIB commences.

25. The apparatus of claim 23, wherein the instance of the DRS is part of a multi-beam DRS transmission, and the instance of the SIB is received as a single beam transmission.

26. A non-transitory computer-readable medium storing code for wireless communication at a user equipment (UE), the code comprising instructions executable to:

receive an instance of a discovery reference signal (DRS) on a beam over a shared radio frequency spectrum band;

receive an instance of a system information block (SIB) on the beam, the instance of the SIB frequency division multiplexed with the instance of the DRS, wherein the instance of the DRS and the instance of the SIB are received according to a DRS-to-SIB transmit power ratio;

determine a public land mobile network identifier (PLMN ID) based at least in part on a time-frequency location of the instance of the DRS, wherein the PLMN ID is determined based at least in part on the instance of the SIB; and selectively perform a random access procedure based at least in part on the determined PLMN ID.

* * * * *